US010757267B2

(12) United States Patent
Neal

(10) Patent No.: US 10,757,267 B2
(45) Date of Patent: Aug. 25, 2020

(54) PLATFORM FOR ENABLING SPONSORS TO SPONSOR FUNCTIONS OF A COMPUTING DEVICE

(71) Applicant: Kajeet, Inc., Bethesda, MD (US)

(72) Inventor: Daniel John Neal, Chevy Chase, MD (US)

(73) Assignee: KAJEET, INC., Bethesda, MD (US)

( * ) Notice: Subject to any disclaimer, the term of this patent is extended or adjusted under 35 U.S.C. 154(b) by 0 days.

(21) Appl. No.: 13/917,035

(22) Filed: Jun. 13, 2013

(65) Prior Publication Data

US 2014/0370847 A1 Dec. 18, 2014

(51) Int. Cl.
*H04M 15/00* (2006.01)

(52) U.S. Cl.
CPC ........... *H04M 15/61* (2013.01); *H04M 15/09* (2013.01); *H04M 15/62* (2013.01)

(58) Field of Classification Search
CPC ...... H04M 15/58; H04M 15/59; H04M 15/61; H04M 3/42306; H04M 15/8094; H04M 2215/0192; H04M 2215/62
USPC .......................................................... 455/406
See application file for complete search history.

(56) References Cited

U.S. PATENT DOCUMENTS

| | | | |
|---|---|---|---|
| 5,221,838 | A | 6/1993 | Gutman et al. |
| 5,285,382 | A | 2/1994 | Muehlberger et al. |
| 5,704,046 | A | 12/1997 | Hogan |
| 5,914,472 | A | 6/1999 | Foladare et al. |
| 5,953,710 | A | 9/1999 | Fleming |
| 6,018,724 | A | 1/2000 | Arent |
| 6,026,291 | A | 2/2000 | Carlsson et al. |
| 6,076,075 | A | 6/2000 | Teicher |
| 6,173,269 | B1 | 1/2001 | Solokl et al. |
| 6,205,436 | B1 | 3/2001 | Rosen |
| 6,222,914 | B1 | 4/2001 | McMullin |
| 6,249,252 | B1 | 6/2001 | Dupray |
| 6,345,263 | B1 | 2/2002 | Matsumoto et al. |
| 6,529,593 | B2 | 3/2003 | Nelson |

(Continued)

FOREIGN PATENT DOCUMENTS

| | | | |
|---|---|---|---|
| AU | 2006100397 | A4 | 3/2007 |
| EP | 0137884 | A1 | 7/1983 |

(Continued)

OTHER PUBLICATIONS

U.S. Appl. No. 13/916,997, filed Jun. 13, 2013, Neal.

(Continued)

*Primary Examiner* — Charles N Appiah
*Assistant Examiner* — Xiang Zhang
(74) *Attorney, Agent, or Firm* — BakerHostetler

(57) ABSTRACT

Systems, methods, and computer-readable media are described for sponsoring functions of computing devices associated with users. A sponsor may define a sponsorship that includes rules for sponsoring certain functions available to a user via a computing device. The execution of the functions may be facilitated, in some instances, by a service provider that may also specify rules and policies that control the functions. As such, when the user executes one or more of the sponsored functions by way of the computing device, instead of charging the associated cost to the user, the service provider may charge the cost to the sponsor based on the associated rules and policies.

25 Claims, 10 Drawing Sheets

Set-up a sponsorship 810

Sign-up for the sponsorship 820

Define additional rules and policies 830

Apply the sponsorship to sponsored functions 840

(56) References Cited

U.S. PATENT DOCUMENTS 6,564,047 B1 5/2003 Steele et al.
6,836,651 B2 12/2004 Segal et al.
6,885,877 B1 4/2005 Ozaki et al.
6,957,058 B2 10/2005 Chan et al.
6,968,385 B1 11/2005 Gilbert
6,990,182 B2 1/2006 Nelson
7,024,174 B2 4/2006 Nagy et al.
7,024,390 B1 4/2006 Mori et al.
7,133,846 B1 11/2006 Ginter et al.
7,155,411 B1 12/2006 Blinn et al.
7,206,769 B2 4/2007 Laurent et al.
7,209,957 B2 4/2007 Patron et al.
7,248,855 B2 7/2007 Joyce et al.
7,249,092 B2 7/2007 Dunn et al.
7,302,272 B2 11/2007 Ackley
7,330,717 B2 2/2008 Gidron et al.
7,333,796 B2 2/2008 Scalisi et al.
7,359,880 B2 4/2008 Abel et al.
7,434,723 B1 10/2008 White et al.
7,457,609 B2 11/2008 Cai
7,516,219 B2 4/2009 Moghaddam et al.
7,580,699 B1 8/2009 Shaw et al.
7,593,714 B2 9/2009 Schultz et al.
7,869,790 B2 1/2011 Singh et al.
7,869,792 B1 1/2011 Zhou et al.
7,881,697 B2 2/2011 Baker
7,899,438 B2 3/2011 Baker
7,933,799 B2 4/2011 Aaltonen et al.
7,945,238 B2 5/2011 Baker
7,945,242 B2 5/2011 Kahn
8,019,354 B2 9/2011 Rae et al.
8,068,825 B2 11/2011 Mikan et al.
8,078,140 B2 12/2011 Baker
8,285,249 B2 10/2012 Baker
8,351,933 B2 1/2013 Ramer et al.
8,577,795 B2 11/2013 Clubb et al.
8,693,358 B2 4/2014 Hodges
8,698,741 B1* 4/2014 Wang .................... G06F 3/0488 345/157
2001/0007983 A1 7/2001 Lee
2001/0011250 A1 8/2001 Paltenghe et al.
2001/0032192 A1 10/2001 Laxmiprassad et al.
2001/0047310 A1 11/2001 Russell
2001/0054059 A1 12/2001 Marks et al.
2002/0022472 A1 2/2002 Watler et al.
2002/0055911 A1 5/2002 Guerreri
2002/0123938 A1 9/2002 Yu et al.
2002/0176377 A1 11/2002 Hamilton
2002/0176553 A1 11/2002 Aschir
2002/0177431 A1 11/2002 Hamilton et al.
2002/0178118 A1 11/2002 Hamilton et al.
2002/0179704 A1 12/2002 Deaton
2002/0187772 A1 12/2002 Hyyppa et al.
2002/0193102 A1 12/2002 Hyyppa et al.
2003/0026404 A1 2/2003 Joyce et al.
2003/0055785 A1 3/2003 Lahiri
2003/0083954 A1 5/2003 Namba
2003/0157948 A1* 8/2003 Nylund ................. H04W 88/04 455/500
2003/0182420 A1 9/2003 Jones et al.
2003/0220835 A1 11/2003 Barnes, Jr.
2004/0018829 A1 1/2004 Raman et al.
2004/0111329 A1 6/2004 Moore
2004/0132431 A1 7/2004 Vandermeijden et al.
2004/0132438 A1 7/2004 White
2004/0139018 A1 7/2004 Anderson et al.
2004/0143550 A1 7/2004 Creamer et al.
2004/0198335 A1 10/2004 Campen
2004/0229600 A1 11/2004 Saez et al.
2004/0235457 A1 11/2004 Florkey et al.
2004/0236688 A1 11/2004 Bozeman
2004/0253941 A1 12/2004 Rivera et al.
2005/0013423 A1 1/2005 Eversen et al.
2005/0096009 A1 5/2005 Ackley
2005/0113130 A1 5/2005 Weinzierl
2005/0171715 A1 8/2005 Saitoh et al.
2005/0216424 A1 9/2005 Gandre et al.
2005/0282559 A1 12/2005 Erskine et al.
2006/0019632 A1 1/2006 Cunningham et al.
2006/0025139 A1 2/2006 Bales et al.
2006/0109969 A1* 5/2006 Oh ........................... 379/207.16
2006/0116105 A1 6/2006 Frankel et al.
2006/0135140 A1 6/2006 Rothman et al.
2006/0252410 A1 11/2006 Bakita et al.
2006/0276180 A1 12/2006 Henry, Jr.
2006/0293057 A1 12/2006 Mazerski et al.
2007/0003034 A1 1/2007 Schultz et al.
2007/0004386 A1 1/2007 Singh et al.
2007/0021102 A1 1/2007 Sherman
2007/0058812 A1 3/2007 Ali et al.
2007/0060100 A1 3/2007 Watler et al.
2007/0077911 A1 4/2007 Raman
2007/0095892 A1 5/2007 Lyons et al.
2007/0099609 A1 5/2007 Cai
2007/0105529 A1 5/2007 Lundstrom et al.
2007/0125840 A1 6/2007 Law et al.
2007/0135135 A1 6/2007 Brown
2007/0155364 A1 7/2007 Andersson
2007/0164098 A1 7/2007 Khalid et al.
2007/0172039 A1 7/2007 Mendiola et al.
2007/0179974 A1 8/2007 Cai et al.
2007/0185983 A1 8/2007 Qi et al.
2007/0198432 A1 8/2007 Pitroda et al.
2007/0243862 A1 10/2007 Coskun et al.
2007/0245026 A1 10/2007 Martin et al.
2007/0267479 A1 11/2007 Nix et al.
2007/0277230 A1 11/2007 Hawkins et al.
2008/0014904 A1 1/2008 Crimi et al.
2008/0015881 A1* 1/2008 Shankar ............................ 705/1
2008/0033880 A1 2/2008 Fiebiger et al.
2008/0039189 A1 2/2008 Walker et al.
2008/0059315 A1* 3/2008 Karaoguz et al. .............. 705/14
2008/0096524 A1 4/2008 True et al.
2008/0119162 A1 5/2008 Sivalingam et al.
2008/0130849 A1 6/2008 Mock et al.
2008/0146211 A1 6/2008 Mikan et al.
2008/0146259 A1 6/2008 Chin et al.
2008/0151847 A1* 6/2008 Abujbara .............. G06F 21/305 370/338
2008/0221985 A1* 9/2008 Civanlar ................ G06Q 30/02 705/14.56
2008/0312968 A1 12/2008 Hannon et al.
2009/0089144 A1 4/2009 Hodge, Jr.
2009/0119132 A1 5/2009 Bolano et al.
2009/0216620 A1 8/2009 Lee
2009/0222517 A1* 9/2009 Kalofonos ............. G06Q 10/10 709/204
2010/0064341 A1 3/2010 Aldera
2010/0076879 A1 3/2010 Mo et al.
2010/0105394 A1* 4/2010 Cheng ................... H04W 36/32 455/440
2010/0128677 A1* 5/2010 Liu ................... H04W 36/0022 370/328
2010/0166169 A1* 7/2010 Ma ..................... G06Q 30/0241 379/216.01
2011/0013569 A1 1/2011 Scherzer et al.
2011/0275346 A1 11/2011 Fraser et al.
2012/0044807 A1 2/2012 Johnson et al.
2012/0149337 A1 6/2012 Singh et al.
2012/0157060 A1* 6/2012 Patterson et al. ............. 455/411
2012/0209753 A1* 8/2012 Hodges ................. H04L 12/146 705/30
2012/0294203 A1* 11/2012 Koorapaty ............ H04L 1/0002 370/280
2013/0029653 A1 1/2013 Baker
2013/0065555 A1 3/2013 Baker et al.
2013/0073395 A1 3/2013 Rincon et al.
2013/0117097 A1 5/2013 Bachman
2013/0183937 A1 7/2013 Neal
2014/0080471 A1 3/2014 Coskun et al.

(56) References Cited

U.S. PATENT DOCUMENTS

| | | | | |
|---|---|---|---|---|
| 2014/0207900 | A1 | 7/2014 | Liu et al. | |
| 2014/0280758 | A1* | 9/2014 | Sharma | H04W 4/021<br>709/219 |
| 2015/0044989 | A1* | 2/2015 | De Foy | H04L 12/1478<br>455/406 |

FOREIGN PATENT DOCUMENTS

| | | | |
|---|---|---|---|
| EP | 0172670 | A2 | 2/1986 |
| EP | 1041520 | A2 | 4/2000 |
| EP | 1072997 | A1 | 1/2001 |
| EP | 1132839 | A1 | 9/2001 |
| EP | 1450322 | A1 | 8/2004 |
| EP | 1528513 | A1 | 4/2005 |
| EP | 1798659 | A1 | 6/2007 |
| EP | 1798943 | A1 | 6/2007 |
| FR | 2863088 | B2 | 6/2005 |
| GB | 2419970 | A | 5/2006 |
| GB | 2425621 | A | 11/2006 |
| GB | 2431072 | A | 4/2007 |
| JP | 59062976 | A | 4/1984 |
| JP | 9-179921 | A | 7/1997 |
| JP | 9-185658 | A | 7/1997 |
| JP | 12-48144 | A | 2/2000 |
| JP | 12-251154 | A | 9/2000 |
| JP | 12-331100 | A | 11/2000 |
| JP | 13-134689 | A | 5/2001 |
| JP | 13-291039 | A | 10/2001 |
| JP | 15-209880 | A | 7/2003 |
| JP | 16-102726 | A | 4/2004 |
| JP | 18-139433 | A | 6/2006 |
| JP | 18-309786 | A | 11/2006 |
| JP | 19-323337 | A | 12/2007 |
| KR | 2001088369 | A | 9/2001 |
| KR | 2002010160 | A | 2/2002 |
| KR | 2002016161 | A | 3/2002 |
| KR | 2003044475 | A | 6/2003 |
| KR | 2004089144 | A | 10/2004 |
| KR | 2005048166 | A | 5/2005 |
| KR | 2007018329 | A | 2/2007 |
| WO | WO 2001/135353 | | 5/2001 |
| WO | WO 2002/084989 | A2 | 10/2002 |
| WO | WO 03092348 | A2 | 11/2003 |
| WO | WO 2004/100094 | A2 | 11/2004 |
| WO | WO 2005/015831 | A2 | 2/2005 |
| WO | WO 2005/017793 | A1 | 2/2005 |
| WO | WO 2005/081664 | A3 | 6/2006 |

OTHER PUBLICATIONS

U.S. Appl. No. 13/917,020, filed Jun. 13, 2013, Neal.

Boyd, "Here Comes the Wallet Phone", IEEE Spectrum, Nov. 2005, pp. 12-14, www.spectrum.ieee.org.

Carstens, "Mechanism for Compiling Payment Information on Mobile Terminals", Jun. 2005, IP.com, #IPCOM000124834D.

Creus et al., "Feature Interaction Control on Smartphones", 2007, IEEE, pp. 302-309.

Diesposti et al., "Dual-Use Personal NavCom Service", IEEE 2000, pp. 69-79, 0-7803-5846-5/00.

Ebringer et al., "Parasitic Authentication to Protect Your E-Wallet", IEEE Computer Oct. 2000, pp. 54-60, 0018-9162/00.

Hung et al, "Security and Privacy Aspects of SmartFlow Internet Payment System", IEEE 1999.

IBM TDB, "Micropayment Scheme", IP.com, #IPCOM000013249D, originally published Apr. 1, 2001, IP.com published Jun. 18, 2003.

Integrated Mobile, Inc., Family-friendly Mobile Services, Presentation, Executive Overview, Nov. 10, 2003, 1-39.

Ishikawa et al., "Mixed-Reality 'Party-Line Night Club'—Synchronization of Networked Avatars and Applications with Mobile Phone Ringtones: Integrating Java3d and LAN-tap Roomware with J2ME", Proceedings of the 2005 The Fifth International Conference on Computer and Information Technology (CIT'05), IEEE 2005, 0-7695-2432-X/05.

Kostov et al., "Cellular Phone Ringing Tone Recommendation System Based on Collaborative Filtering Method", IEEE 2003, pp. 378-383, 0-7803-7866-0/03.

Labrou et al, "Wireless Wallet", Proceedings of the First Annual International conference on Moibile and Ubiquitious Sustems: Networking and Services, 2004.

Lee et al.. "i-Ring: A System for Humming Transcription and Chord Generation". IEEE 2004, pp. 1031-1034, 0-7803-8603-5/04.

Lennox, "Feature Interaction in Internet Telephony," Sixth Feature Interaction Workshop, Columbia University, May 17, 2000, 15 pages.

Leung et al., "On Designing a Flexible E-Payment System with Fraud Detection Capability", IEEE 2004, Proceedings of the IEEE International Conference onE-Commerce Technology, 0-7695-2098-7/04.

Me et al, "EC-Pay: An Efficient and Secure ECC-based Wireless Local Payment Scheme", Proceedings of the Third International Conference on Information Technology and Applications 2005.

Mjolsnes et al., "On-line E-Wallet System with Decentralized Credential Keepers", Mobile Networks and Applications 8, pp. 87-99, published by Kluwer Academic Publishers, 2003.

Pierce et al., "RF Wallet With Fraud Protection", IP.com, #IPCOM000009305D, originally published Jun. 1, 1999, IP.com published Aug. 15, 2002.

Raposo et al, "A Web Agent for Automating E-commerce Operations", Proceedings of the IEEE International Conference on E-Commerce 2003.

Schmandt et al., "Impromptu: Managing Networked Audio Applications for Mobile Users", ACM 2004, pp. 59-69, 1-58113-793—Jan. 4, 2006.

Tang et al., "Distributed Family Wallet Architecture and Secure Inter-Purse Operations", IEEE 2000, pp. 110-111, 0-7803-6301-9/00.

Varshney, "Location Management for Mobile Commerce Applications in Wireless Internet Environment", ACM Transactions on Internet Technology, vol. 3, No. 3, Aug. 2003, pp. 236-255.

Yang et al, "A Three-Party Authenticated Key Exchange Scheme Smartcard using Elliptic Curve Cryptosystem for Secure Key Exchange in Wireless Sensor Network", IEEE, 2007.

U.S. Appl. No. 13/916,997; Final Office Action; dated Jul. 30, 2015; 32 pages.

U.S. Appl. No. 13/917,020; Non-Final Office Action; dated Feb. 18, 2015; 20 pages.

U.S. Appl. No. 14/577,616, filed Dec. 19, 2014, Neal et al.

U.S. Appl. No. 14/590,862, filed Jan. 6, 2015, Baker.

U.S. Appl. No. 13/786,735: Non-Final Office Action dated Jan. 29, 2014; 37 pages.

U.S. Appl. No. 13/786,694: Non-Final Office Action dated Feb. 4, 2014; 31 pages.

U.S. Appl. No. 13/744,342; Notice of Allowance; dated Aug. 18, 2014; 9 pages.

U.S. Appl. No. 13/786,986; Non-Final Office Action; dated Oct. 22, 2014; 14 pages.

U.S. Appl. No. 13/786,685; Non-Final Office Action; dated Nov. 6, 2014; 18 pages.

U.S. Appl. No. 13/786,694; Non-Final Office Action; dated Jan. 4, 2016; 30 pages.

U.S. Appl. No. 13/786,966; Non-Final Office Action; dated Jun. 30, 2015; 16 pages.

U.S. Appl. No. 13/786,694; Non-Final Office Action; dated Jan. 30, 2015; 32 pages.

U.S. Appl. No. 13/917,020; Final Office Action; dated Dec. 14, 2015; 21 pages.

U.S. Appl. No. 13/916,997; Final Office Action; dated Nov. 14, 2014; 22 pages.

U.S. Appl. No. 14/732,440; Non-Final Office Action; dated Sep. 15, 2016; 17 pages.

U.S. Appl. No. 13/917,020; Non-Final Office Action; dated Jun. 23, 2017; 28 pages.

U.S. Appl. No. 13/916,997; Non-Final Office Action; dated May 9, 2017; 37 pages.

U.S. Appl. No. 13/917,020; Final Office Action; dated Nov. 17, 2016; 35 pages.

(56) References Cited

OTHER PUBLICATIONS

U.S. Appl. No. 14/590,862; Non-Final Office Action; dated Dec. 5, 2016; 10 pages.
U.S. Appl. No. 13/917,020; Non-Final Office Action; dated Aug. 2, 2018; 32 pages.
U.S. Appl. No. 13/917,020; Final Office Action; dated Jan. 23, 2018; 30 pages.
U.S. Appl. No. 13/917,020; Notice of Allowance; dated Mar. 20, 2019; 17 pages.

* cited by examiner

Subscriber Portal

| Option | Selected |
|---|---|
| Opt-in to sponsorships | ○ |
| Select sponsorships based on my criteria | ○ |
| Sign up upfront to a set of sponsorships | ● |
| Accept a set of sponsorships to be automatically pushed | ○ |

FIG. 6A

Subscriber Portal

Search

Alphabetical Order | Category | Sponsorship Rule | Friends

Allow All ○

| Sponsorship Name | Sponsor Name | Rule | Allow |
| --- | --- | --- | --- |
| ABC Free | Company ABC | Access to website CompanyABC.com is free | ○ |
| Happy Hour Free | Company 123 | All airtime/data usage is free between 2:00 PM and 6:00 PM at location 123 | ○ |
| ⋮ | ⋮ | ⋮ | ⋮ |
| Location-Based Free | Company N | Connectivity is free if you provide me your location information | ○ |

FIG. 6B

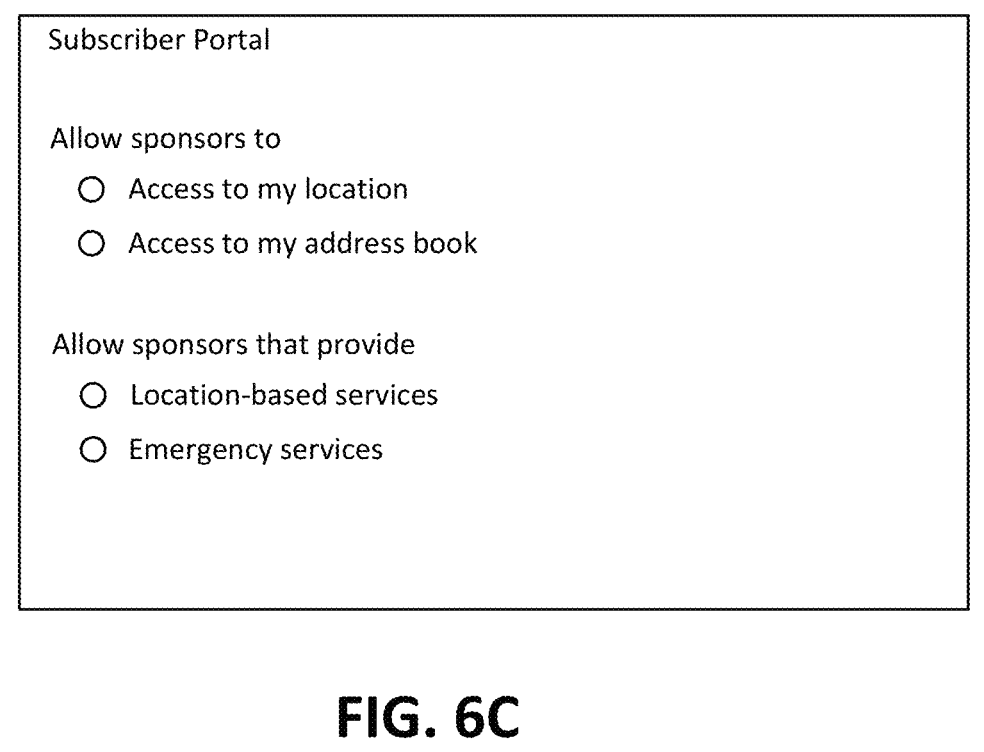

Subscriber Portal

Allow sponsors to

- Access to my location
- Access to my address book

Allow sponsors that provide

- Location-based services
- Emergency services

FIG. 6C

Sponsor Portal

Search

Subscribers | Group of Subscribers | Service Providers | Location

| Subscriber | Sponsor | Sponsorship |
|---|---|---|
| Subscriber 1 | ○ | Sponsorship 1 ▶ |
| Subscriber 2 | ○ | Sponsorship 1 and Sponsorship 2 ▶ |
| ... | ... | ... ▶ |
| Subscriber N | ○ | Sponsorship M ▶ |

Sponsor All ○

Define Sponsorship

| | |
|---|---|
| Sponsorship 1 | Pay for data |
| Sponsorship 2 | Pay for voice |
| ... | ... |
| Sponsorship M | Pay only for visiting website |

FIG. 7

PLATFORM FOR ENABLING SPONSORS TO SPONSOR FUNCTIONS OF A COMPUTING DEVICE

CROSS REFERENCE TO RELATED APPLICATIONS

This application is related by subject matter to that which is disclosed in the following commonly assigned application: U.S. patent application Ser. No. 13/916,997, entitled "PLATFORM FOR ENABLING SPONSORED FUNCTIONS OF A COMPUTING DEVICE," and U.S. patent application Ser. No. 13/917,020, entitled "PLATFORM FOR ENABLING USERS TO SIGN UP FOR SPONSORED FUNCTIONS ON COMPUTING DEVICES," all filed on Jun. 13, 2013, the entirety of each application is hereby incorporated by reference herein.

BACKGROUND

Personal electronic devices have become staple items of everyday life. They provide a wide spectrum of functionalities of which users take advantage. Coupled with connectivity, such as the ability to access a public network (e.g., Internet), a wireless network, or the like, the personal electronic devices have become essential to communications between the users.

With the ever increasing availability and bandwidth of connectivity, the personal electronic devices allow the users to be connected at almost all times. From basic voice functionality using, e.g., a cell phone, to more advanced data functionality using, e.g., a smartphone or a tablet, the users can communicate with each other, conduct e-commerce and m-commerce, surf the Internet, stream content, or the like on a 24/7 basis.

This connectivity, however, comes with a cost. Service providers typically charge users for using their networks based on, for example, the airtime (e.g., voice minutes) or the size of the data (e.g., megabytes or gigabytes of data) that is used. Various charging models are available and include pre-paid and post-paid models. In the pre-paid model, a user pre-pays for an amount of voice/data that he or she can use over the network of a service provider before actually using the voice/data functionalities. In comparison, in the post-paid model, the service provider charges the user for the amount of voice/data that he or she actually used in a certain billing cycle.

The various charging models may limit the functionalities of the personal electronic devices when connected to the network of the service provider. For example, in the pre-paid model, once the amount of voice/data is used, the user may no longer be able to use his or her personal electronic device for additional voice/data functionalities that require use of the network. Similarly, in the post-paid model, the service provider and/or the user may impose a cap on the amount of voice/data that can be used in the billing cycle. Once the cap is reached, the corresponding functionalities of the personal electronic device may be disabled. Further, in other situations, the user may have signed up for only a subset of available functionalities (e.g., voice services). In this situation, the user may not be able to use the personal electronic device to perform functions for which he or she was not signed up (e.g., exchange data over the network).

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 6A, 6B, and 6C illustrate an example interface for signing up to sponsored content and connectivity, according to embodiments;

FIG. 7 illustrates an example interface for setting up sponsored content and connectivity, according to embodiments.

DETAILED DESCRIPTION OF ILLUSTRATIVE EMBODIMENTS

Figure 1:
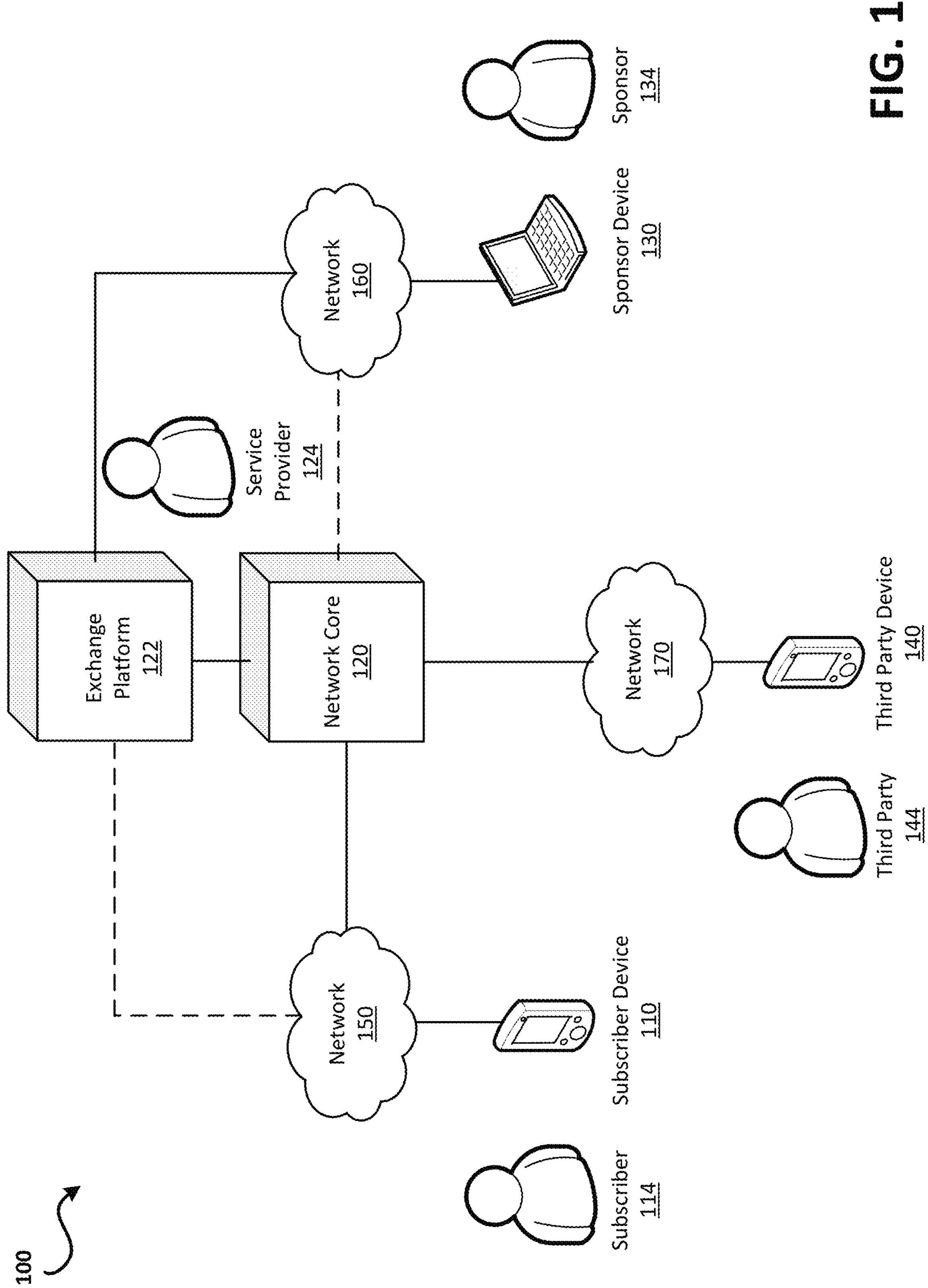
FIG. 1 illustrates an example operating environment for providing sponsored content and connectivity, according to embodiments.

As noted above, the various charging models applied by the service provider may limit the functionalities of the personal electronic devices. The techniques described herein allow the functionalities to be extended to the users regardless of the charging models and their associated limits. More particularly, the techniques involve an entity that sponsors functionalities and/or services (e.g., connectivity, airtime minutes, data bandwidth, data size, content, rate of data transmission, data speed including data throttling options or alternatives, device cost, ownership cost, operation cost, etc.) on behalf of the users.

The entity may be referenced herein below as a "sponsor" and typically includes a user of a service of the service provider for sponsoring the functionalities. The service provider may charge the sponsor a fee for using the service and/or fees corresponding to charges for the sponsored functionalities as used by the users. For clarity purposes, the users that use the functionalities by way of the personal electronic devices over the network may be referenced herein below as "subscribers." A subscriber typically has an arrangement with the service provider (e.g., a subscription to various services provided by the service provider) by which the subscriber uses the network of the service provider and by which the service provider applies a charging model(s) to users of the network. As further described below, the service provider may not charge the subscriber for the use of the network when such a use is sponsored but may charge the sponsor instead. The service provider may be a company that provides network-based services and may include, for example, a network operator, a network service provider, an internet service provider, a telecommunications service provider, a wireless service provider, a mobile virtual network operator, a carrier provider, a cloud service provider, or the like.

The sponsor may not be related to the subscriber except by way of a sponsorship for which the subscriber has signed-up (e.g., the subscriber agrees to and accepts the terms and conditions of a specific sponsorship offered by the service provider and paid for by the sponsor). Also, the sponsor in some cases may be a subscriber (e.g., a user or an entity that has an arrangement with the service provider for using the network). Further, a sponsor may sponsor functionalities and services of other sponsors. In typical situations, the sponsor may be any or a combination of a product company, a media company, an advertiser, a government office or entity, a movie studio, or any entity that aims to sell a product or a service or to get a message or offer to the subscribers.

Further detail about sponsoring the functionalities is provided herein. It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, desktop or other computers, personal digital assistants, e-readers, cellular telephone devices, smartphones, tablets, wireless phones, pagers, electronic organizers, special-purposed hardware devices, database servers, network storage devices, network appliances, other network devices, and various other consumer products that include appropriate communication capabilities. The embodiments described herein may also be practiced in distributed computing environments, where tasks are performed by remote processing devices that are linked through a communications network. In a distributed computing environment, program modules may be located in both local and remote memory storage devices.

FIG. 1 illustrates an example of a suitable operating environment 100 for sponsoring the functionalities. As illustrated, the operating environment 100 includes various computing systems and components associated with the subscribers (shown as a subscriber 114), the service providers (shown as a service provider 124), the sponsors (shown as a sponsor 134), and third parties (shown as a third party 144). In the interest of clarity of explanation, FIG. 1 is described with respect to a single subscriber, a single service provider, a single sponsor, a single third party, and their associated computing devices. However, the described techniques can also be used in connection with a plurality of subscribers, service providers, sponsors, and/or third parties.

The computing systems and components of FIG. 1 can be configured such that the sponsor 134 can set up a sponsorship, the subscriber 114 can sign up for the sponsorship, and the service provider 124 can enforce the sponsorship. The process for setting up, signing up for, and enforcing the sponsorship can be automated and can be configured to allow participants (e.g., the subscriber 114, the service provider 124, and the sponsor 134) to dynamically and autonomously execute their respective portions of the process. In other words, the sponsor 134 can dynamically set up and update the sponsorship without input from the subscriber 114 or the service provider 124. Likewise, the subscriber 114 can dynamically sign up and update the sign-up to the sponsorship without input from the sponsor 134 or the service provider 124. Also, the service provider 124 can dynamically enforce and update the enforcement of the sponsorship without input from the subscriber 114 or the sponsor 134.

As explained herein above, the sponsorship is provided in association with services of the service provider 124. These services may include, for example, facilitating an interaction between the subscriber 114 and the third party 144. The subscriber 114 may use a subscriber device 110 to interact with a third party device 140 associated with the third party 144. This interaction includes, for example, communicating with the third party 144 by way of the subscriber device 110 and the third party device 140 over a network core 120 of the service provider 124 and networks 150 and 170 that may or may not be associated with the service provider 124.

The third party 144 may be any user that the subscriber 114 interacts with. For example, it may be another subscriber to the services of the service provider 124 or a subscriber to another service provider. To illustrate, the subscriber device 110 and the third party device 140 may be wireless phones used to place calls or exchange data (e.g., text messages, picture messages, or any other messages that use a messaging platform that may be developed in the future) between the subscriber 114 and the third party 144. In another example, the third party 144 need not be a subscriber but, instead, may be a company or an organization that provides network-based services. In this case, the third party device 140 may be a server or any other network-based computing system that, for example, hosts a website or provides a web-based application (e.g., content streaming) accessible to the subscriber device 110.

The network core 120 may include the computing and network infrastructure that is operated by the service provider 124 to provide services to its subscribers such as a cellular network, a telephony network, a fiber-optic network, or combinations thereof. This network core may be configured to authenticate the subscriber 114 and to provide services to the subscriber device 110. For example, it may be configured to route the communication to and from the subscriber device 110 and to charge for uses of the services. Further detail about the network core 120 is described in FIGS. 3 and 4.

In comparison, the networks 150 and 170 may or may not be operated by the service provider 124. They include a communications network of any type that is suitable for providing communications between the subscriber device 110 and the third party device 140 and may include a combination of discrete networks, which may use different technologies. For example, the networks 150 and 170 can include a radio access network (RAN), a WiFi/broadband network, a local area network (LAN), a wide area network (WAN), or combinations thereof. In an example embodiment, the WiFi/broadband network includes the Internet and any networks adapted to communicate with the Internet.

In association with the interaction between the subscriber device 110 and the third party device 140 by way of the network core 120, the service provider 124 may charge the subscriber 114 for the services provided. These services include, for example, voice and data functionalities initiated at the subscriber device 110 and/or the third party device 140 and facilitated by the network core 120. To enable the charging, the service provider 124 may associate the subscriber 114 with a subscription. This subscription can be managed at the network core 120, may include, for example, a charging model (e.g., pre-paid, post-paid, etc.), and may track the subscriber device 110's uses of the network core 120's services. Further detail about the subscription is described in FIG. 5.

In addition to the network core 120, the service provider may operate an exchange platform 122. This exchange platform may be a standalone computing system (e.g., a server) that interfaces with the network core 120 or may be integrated with components of the network core 120 (e.g., its functionalities are implemented as hardware modules, software modules, or a combination thereof that are integrated with the network core 120).

In an example, the exchange platform 122 may provide an interface to the subscriber 114 for retrieving and updating information regarding the subscription. The subscriber 114 can access the interface using the subscriber device 110 or another computing device (e.g., a desktop computer) over the network 150. This access to the interface need not but can be routed through the network core 120. The interface may allow the subscriber 114 to get information about his or her uses of the services of the service provider 124, such as the amount of airtime minutes and data used, the charges (e.g., a bill within a cycling period), or the like. The interface may also allow the subscriber 114 to pay for the charges, to update the subscription (e.g., adding a functionality such as data connectivity if the subscriber 114 was not signed up for data services), or the like.

Furthermore, the exchange platform 122 may be configured to allow the sponsor 134 to set up the sponsorship, the subscriber 114 to sign up for the sponsorship, and the service provider 124 to enforce the sponsorship. For example, the exchange platform 122 may provide an interface that allows the sponsor 134 to define various aspects of the sponsorship. The sponsor 134 may operate a sponsor device 130 to access the interface over a network 160. The network 160 may include components similar to the components of the networks 150 and 170. This access to the interface need not but may also be by way of the network core 120 when, for instance, the sponsor 134 is a subscriber to services of the service provider 124.

Upon accessing the interface, the sponsor 134 can define, for example, a type of the sponsorship. The sponsorship type can include any or a combination of sponsored functionalities or services, such as sponsored connectivity and sponsored content. Sponsored connectivity may involve sponsoring the interaction of the subscriber 114 with the third party 144 by way of the network core 120 (e.g., paying for charges incurred by the subscriber 134 for using the services of the service provider 124 to communicate with the third party 144). This includes, for instance, the sponsor 134 assuming charges on behalf of the subscriber 114 for airtime and data usages for interacting with the third party 144. In comparison, sponsored content may involve sponsoring the content associated with the interaction (e.g., paying for charges incurred by the subscriber 134 for using the content). This includes, for instance, the sponsor 134 assuming charges on behalf of the subscriber 114 for the cost of the content (e.g., cost associated with a license to use the content, an access to a selected web site, a download of an application, a download or upload a file, etc.) when the subscriber 114 transmits to or receives the content from the third party 144.

In addition to the described sponsored connectivity and content, the sponsor 134 can define other types of sponsorships. For example, the sponsorship may involve sponsoring data bandwidth (e.g., a rate of data transmission experienced by the subscriber 114 on the subscriber device 110), data size (e.g., an amount of data that the subscriber 114 may upload or download over the network core 120), service upgrade (e.g., the subscriber 114 signs-up for a service provided by the service provider 124 and the sponsorship adds features, capabilities, functions, or the like to the service), or device cost (e.g., the cost of purchasing, owning, operating, etc. the subscriber device 110 may be subsidized or covered using the sponsorship), to name a few. In an example, if the subscriber 114 signs up for third generation (3G) cellular services of the service provider 124, the sponsorship may upgrade this 3G service to fourth generation (4G) services that are also supported by the service provider 124. In another example, instead of paying for the subscriber device 110 when the subscriber 114 signs up to the service(s) of the service provider 114, if the subscriber 114, signs-up for the sponsorship, the subscriber 114 need not pay for the subscriber device 110 or may need to pay for it at a discounted rate. In this example, the sponsor 134 would pay for the subscriber device 110 or for the cost of the discount. Although the examples used herein may describe uses of sponsored connectivity and sponsored content, the description of these examples similarly applies to the other types of sponsorships unrelated to those described herein and are not repeated for clarity purpose.

Further, the sponsor 134 can define various parameters that the sponsorships may or may not be conditioned on. These parameters may include demographics of the subscriber 114, the location of the subscriber device 110, predefined thresholds set by the service provider 124, or the like. For example, a data bandwidth sponsorship may be applicable (e.g., goes into effect and covers the cost incurred by the subscriber 114) when the subscriber 114's data usage passes a threshold. To illustrate, if the service provider 124 throttles down the data speed of the subscriber 114 (e.g., the data speed is changed from one Gbps to 256 Mbps) when the amount of data that he or she uses within a timeframe (e.g., a billing cycle) reaches a certain threshold (e.g., two gigabytes within a month cycle), this sponsorship may become applicable and raises the data speed to its pre-existing level (e.g., the data speed before it was throttled down), a similar level, or even a higher level, such that the subscriber 114's overall experience of the data speed is substantially unaltered or improved. One skilled in the art will appreciate that various other parameters may be implemented. For example, the sponsorship may be conditioned on the subscriber 114 taking an opinion poll or may be bundled with the subscriber 114 signing up for another service of the service provider 124 or another sponsorship offered by the sponsor 134 or made available by the service provider 124.

In addition to defining the type of the sponsorship and conditioning parameters, if any, the interface may allow the sponsor 144 to define rules associated therewith. These rules may describe the when (e.g., time frame when the sponsorship may be available), what (e.g., whether the sponsorship will fully or partially cover the charges incurred by the subscriber 114, the sponsored functionalities, etc.), how (e.g., the information required from the subscriber 114 to sign up for the sponsorship), who (e.g., the subscribers of the service provider 124 that the sponsorship is available to), where (e.g., the sponsorship may be available at a certain location or within a certain geographic area), and other conditions (e.g., the sponsorship may be available based up on certain characteristics of the subscriber as established by the sponsor and agreed to by the subscriber) associated with applying the sponsorship to cover the costs incurred by the subscriber. 114. Further, the rules may be static (e.g., the rule does not change based on the location for the subscriber device 110) or dynamic (e.g., the rules change over time or be based on the location of the subscriber device 110, or may dynamically apply other defined rules). Example of these rules include sponsoring connectivity and/or content based on time of day, date, location, certain uniform resource locators (URLs) or types of content, file protocols, etc. Further details about the sponsorship and the interface are described in FIGS. 5 and 7.

Once the sponsor 134 sets up the sponsorship, the subscriber 114 can sign up for it by way of the exchange platform 122. For example, the exchange platform may also provide an interface to the subscriber 114 such that he or she may use the subscriber device 110 or another computing device to access information about the sponsorship. Upon accessing the interface, the subscriber 114 may search for sponsorships, look for types and/or rules of sponsorships, sign up for a number of sponsorships, and agree to provide information required by the corresponding rules. Further detail about this interface is described in FIGS. 5 and 6A-6C. Briefly, the subscriber 114 may opt-in to all sponsorships available through the exchange platform, may select specific sponsorships, may sign-up for a sponsorship up-front (e.g., when signing up for a service of the service provider 124 or purchasing a subscriber device therefrom, the subscriber 114 may agree to sponsorships associated with the service and/or device), or may agree to accept a sponsorship automatically provided or pushed to him or her based on a certain condition.

To illustrate, the service provider 124 may make an offer for a service to the market place that includes a pre-existing sponsorship or set of sponsorships, to which the subscriber 114 may agree when he or she accepts the service conditions associated with the subscription to the service; this would mean that the sponsorships occur automatically from the standpoint of the subscriber 114, who does not have to take action in order to accept and benefit from the sponsorships. For example, when the subscriber 114 signs-up for the service offered by the service provider 124, the subscriber may agree that whenever he or she enters or is within an area or a location, such as a store, a shopping mall, a building, a park, an airplane cabin, etc., then the service is automatically sponsored by a particular sponsorship offered from the sponsor 134. In this manner, the subscriber 114 need not take any additional steps to benefit from the particular sponsorship, beyond being in the area and using the service via the subscriber device 110. Instead, the particular sponsorship may be automatically applied to his or her use of the service.

Similarly, the service provider 124 may offer a "CompanyABC phone" rate plan or subscription, under which all the data connectivity is paid for by CompanyABC (e.g., CompanyABC is an example of the sponsor 134) and, therefore, is free to the subscriber 110 whenever he or she is in a store of CompanyABC. Similarly, a service may be partly or fully paid for by a sponsor in exchange for the subscriber agreeing to view or hear advertising from that sponsor. In a further example, the service provider 124 may offer a "CompanyABC plan" where all data connectivity to the CompanyABC.com website and all of its related URLs may be paid for by CompanyABC and, thus, may be free to the subscriber 114. In these examples, once the subscriber 114 signs up for CompanyABC phone rate plan or CompanyABC plan, subscriber 114 need not take further action to sign-up for the sponsorship. Also, in these examples, CompanyABC may benefit from additional traffic that the sponsorship may bring (e.g., the subscriber 114 physically visiting the store or virtually visiting the website).

Further, the exchange platform 122 may also alert the subscriber 114 of new, existing, or expiring sponsorships. For example, the exchange platform may send a notification message to the subscriber device 110 or to an electronic address of the subscriber 114 describing any of these sponsorships.

The exchange platform 122 may also allow the service provider 124 to define rules for applying the sponsorship. For example, the service provider 124 may describe conditions for when charges incurred by the subscriber 114 can be covered by the sponsor 134 under the sponsorship. This may involve a description of what subscribers of the service provider 124 to whom the sponsorship may be made available. Also, in a pre-paid charging model, the service provider 124 may allow the sponsorship to cover the charges only when the subscriber 114 has exhausted the amount of voice and data available in the subscription. Similarly, in a post-paid charging model, the service provider 124 may allow the sponsorship to cover the charges only when a cap that limits the amount of voice and data that can be used in a billing cycle is reached.

The exchange platform 122 may also include a decision module, an enforcement module, or a combination thereof configured to decide whether the sponsorship is applicable and to automatically apply the sponsorship to the charges incurred by the subscriber 114 based on the rules defined by the sponsor 134 and the service provider 124. In this way, the exchange platform 122 enables and mediates, for example, connectivity and/or delivery of content to the subscriber device 110 based on the sponsorship. Further detail about this feature of the exchange platform 122 is described in FIGS. 3-5.

To illustrate some of the above features of the exchange platform 122, the following scenarios are described. In a first scenario, the sponsor 134 may, using the interface to the exchange platform 122, may specify that "all subscribers of carrier X get free access specifically to the CompanyABC.com website and all of its related URLs whenever they are connected to the carrier's network, even if a subscriber: (a) has no data plan, or (b) has a data plan but has run out of data at the time he or she seeks to access CompanyABC.com." Under this sponsorship, the exchange platform 122 allows the subscriber 114 to access the CompanyABC.com website, while the cost of the data associated with such access by way of the network core 120 is charged to the sponsor 134, even when the subscriber 114 has not signed up for data services or has run out of usable data services.

In another scenario, the sponsor 134 may specify that "all subscribers of carrier get free movies from the CompanyABC.com website but the cost associated with data usage for streaming the movies is not sponsored." Under this sponsorship, while the exchange platform 122 allows the subscriber 114 to receive a free movie, it requires that he or she pays for the data usage when the movie is streamed from the CompanyABC.com website to the subscriber device 110.

In yet another example, the sponsor 134 can specify that "all subscribers of carrier Y get free connectivity to access the CompanyABC.com website and free content downloaded from the CompanyABC.com website any time the subscribers are within one mile of a Company123 store." Under this sponsorship, the exchange platform 122 allows the subscriber 114 to receive sponsored connectivity and content based on a location of the subscriber device 110.

A further scenario may involve the sponsor 134 specifying, with respect to the subscriber 114 or a group of subscribers: "If you (the subscriber) agree to provide me (the sponsor) with your locations, I will sponsor all (or selected types) of your data connectivity. If you provide me with additional data about you (e.g., age), I will sponsor selected content." Under this sponsorship, the exchange platform 122 allows the subscriber 114 to provide certain information to the sponsor 134 in return for a certain type of sponsorship. These scenarios are merely illustrative and one skilled in the art will appreciate that various other features and services of the exchange platform 122 may be implemented.

Figure 2:
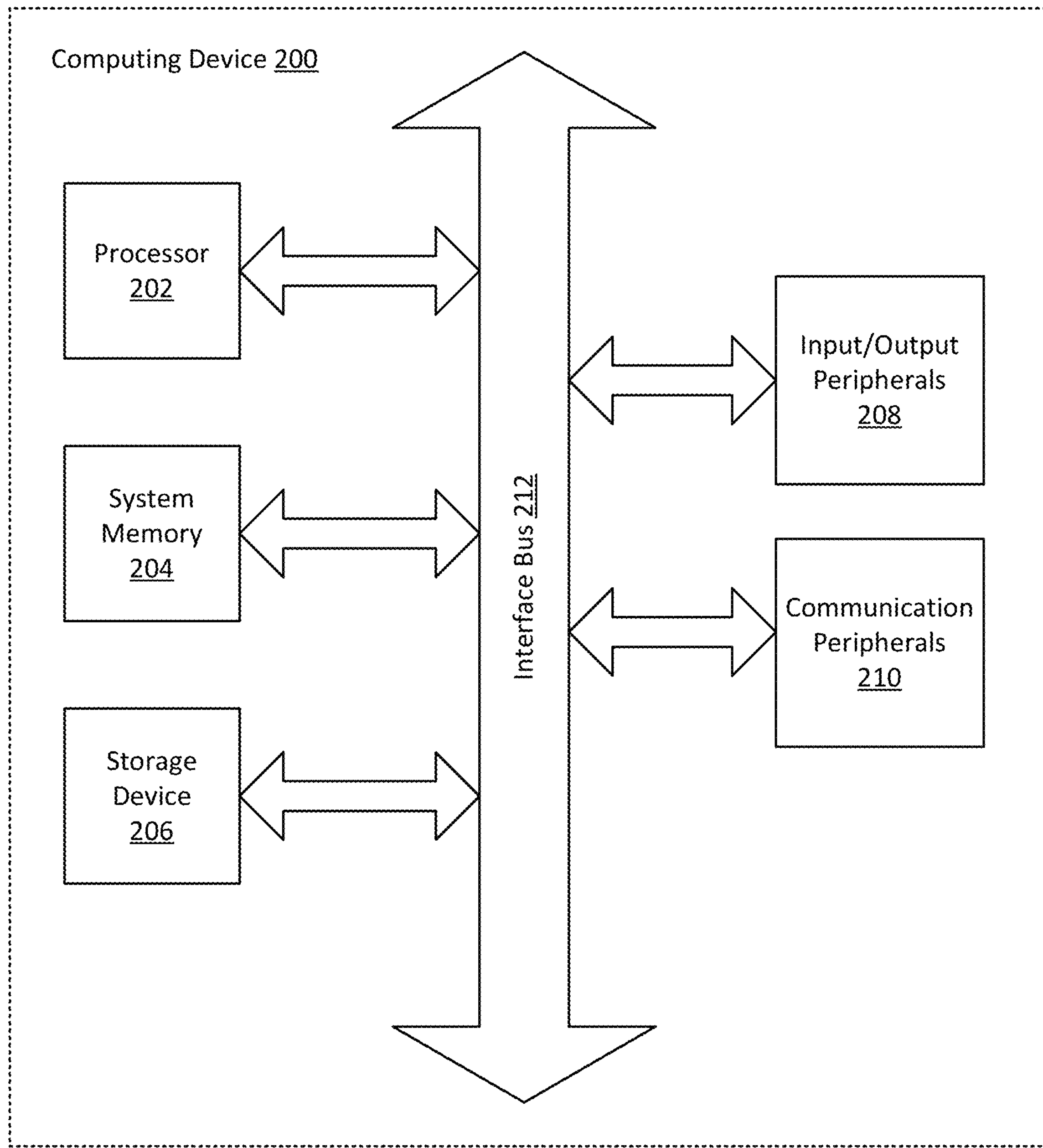
FIG. 2 illustrates an example computing system that may be used in the example operating environment, according to embodiments.

Turning to FIG. 2, this figure shows an example computer architecture of a computing device 200 capable of executing the above-described features. The subscriber device 110, the network core 120, the exchange platform 122, the sponsor device 130, and/or the third party device 140 of FIG. 1 may implement some or all elements of the computing device 200. More particularly, FIG. 2 illustrates an example of circuitry for the computing device 200. As used herein, the term "circuitry" includes hardware components (e.g., microprocessors, application specific integrated circuits, processors, etc.) configured using firmware and software that implement the monitoring and detecting techniques described herein. For example, a processor can be configured by instructions loaded from memory, e.g., random access memory (RAM), read-only memory (ROM), firmware, and/or mass storage, embodying logic operable to configure the processor to perform the functionalities disclosed herein.

FIG. 2 illustrates that the circuitry may at least include a processor 202, a system memory 204, a storage device 206, input/output peripherals 208, communication peripherals 210, and an interface bus 212. The interface bus 212 may be configured to communicate, transmit, and transfer data, controls, and commands among the various components of the computing device 200. The system memory 204 and the storage device 206 may comprise computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage mediums can be configured to store instructions or program codes embodying aspects of the disclosure. The system memory 204 and the storage device 206 may also comprise computer readable signal media. A computer readable signal medium may include a propagated data signal with computer readable program code embodied therein. Such a propagated signal may take any of a variety of forms including, but not limited to, electromagnetic, optical, or any combination thereof. A computer readable signal medium may be any computer readable medium that is not a computer readable storage medium and that can communicate, propagate, or transport a program for use in connection with the computing device 200.

Further, the system memory 204 may comprise an operation system and applications. The processor 202 may be configured to execute the stored instructions and can comprise, for example, a logical processing unit, a microprocessor, a digital signal processor, and the like. The input and output peripherals 208 may include user interfaces such as a keyboard, screen, microphone, speaker, other input/output devices, and computing components such as digital-to-analog and analog-to-digital converters, graphical processing units, serial ports, parallel ports, universal serial bus, signal generators, filters, signal processors, location-based modules, and the like. For example, the location based-module may process a signal from a satellite positioning system (e.g., global positioning system (GPS) satellite) to determine location information of the computing device 200 (e.g., GPS coordinates). Likewise, the location-based module may process cellular or Wi-Fi triangulation signals to determine similar location information. The input/output peripherals may be connected to the processor 202 through any of the ports coupled to the interface bus 212.

The user interfaces can also be configured to allow a user of the computing device 200 to interact within the operating environment 100 of FIG. 1. For example, the computing device 200 may include instructions that, when executed, cause the computing device 200 to generate a user interface that the user can use to provide input to the computing device 200 and to receive an output from the computing device 200. This user interface may be in the form of a graphical user interface that is rendered at the screen and that is coupled with audio transmitted on the speaker and microphone and input received at the keyboard. In an embodiment, the user interface can be locally generated at the computing device 200. In another embodiment, the user interface may be hosted on a remote computing device and rendered at the computing device 200. For example, the remote computing device (e.g., a server) may generate the user interface and may transmit information related thereto to the computing device 200 that, in turn, renders the user interface to the user. The computing device 200 may, for example, execute a browser or an application that exposes an application program interface (API) at the remote computing device to access the user interface hosted on the remote computing device.

Finally, the communication peripherals 210 may be configured to facilitate communication between the computing device 200 and other computing devices over a communications network and may include, for example, a network interface controller, modem, various modulators/demodulators and encoders/decoders, wireless and wired interface cards, antenna, transmitters, receivers, and the like.

Figure 3:
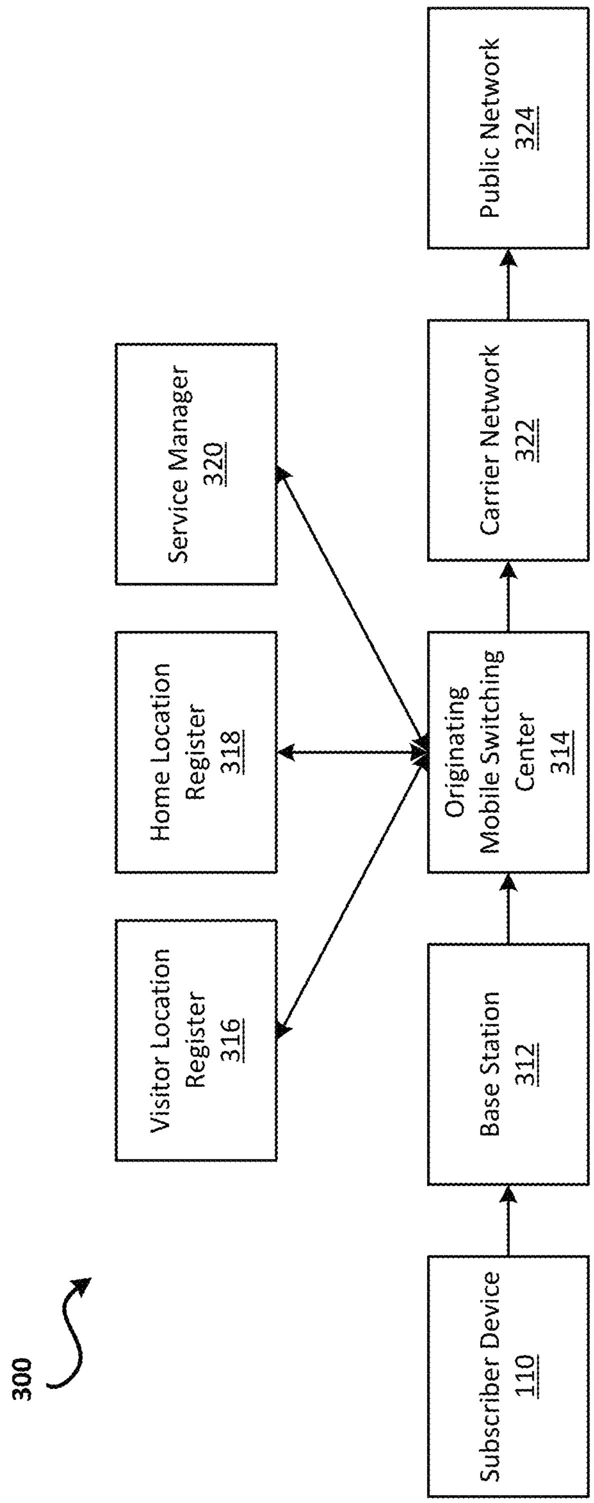
FIG. 3 illustrates an example block diagram for initiating and permitting a service, according to embodiments.
Figure 4:
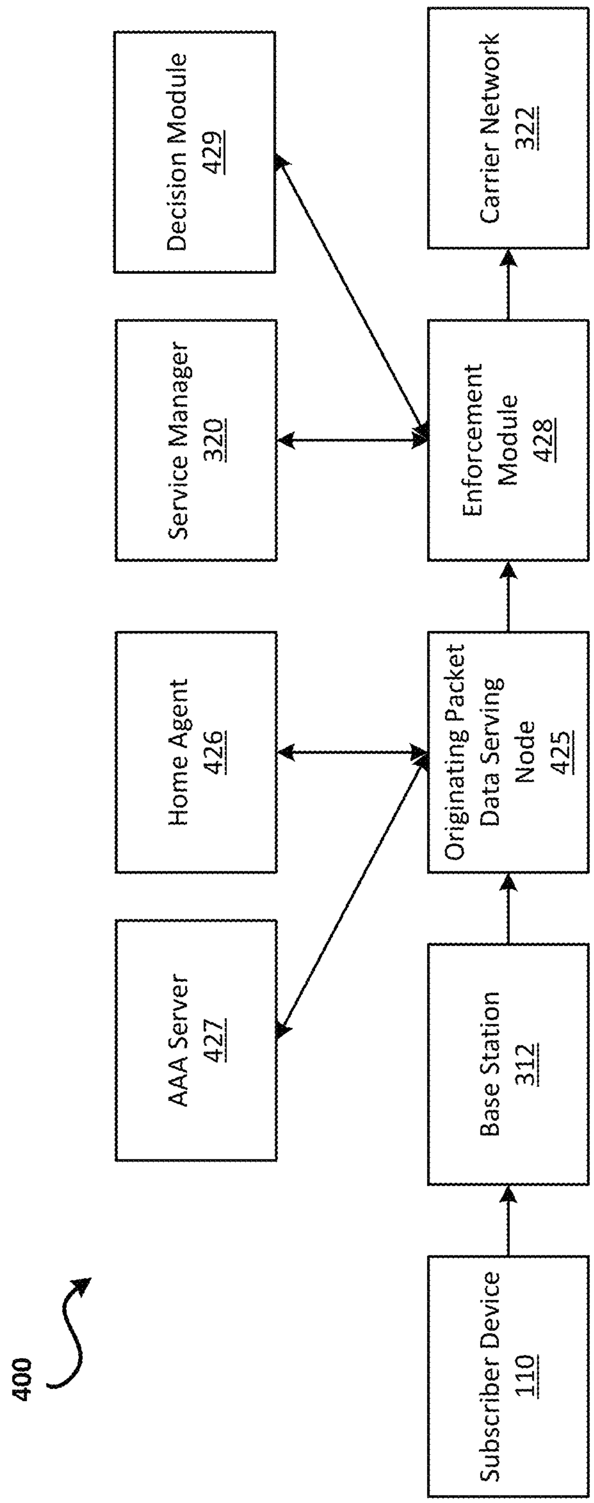
FIG. 4 illustrates an example block diagram for initiating and permitting a data session, according to embodiments.

As described herein above, the network core 120 and the exchange platform 122 of FIG. 1 may implement some or all elements of the computing device 200 of FIG. 2 and may be integrated or may be implemented as standalone computing and communication systems. FIGS. 3 and 4 illustrate further example architectures for implementing the network core 120 and the exchange platform 122. These figures are illustrative and one skilled in the art will appreciate that various other architectures of the network core 120 and the exchange platform 122 may be implemented.

Turning to FIG. 3, this figure illustrates an operating environment 300 configured such that the network core 120 and the exchange platform 122 service a call placed using the subscriber device 110. As illustrated, the network core 120 may include a base station 312, an originating mobile switching center 314, a visitor location register 316, a home location register 318, and a carrier network 322. The network core 120 may also include a service manager 320. In such a configuration, the exchange platform 122 may be integrated with the network core 120 by way of the service manager 320 (e.g., the service manager 320 may be configured to implement the functionalities of the exchange platform 122). Alternatively, the service manager 320 may be a standalone computing system that interfaces with the network core 120 and that is integrated with the exchange platform 122. In yet another embodiment, the service manager 320 may be a standalone computing system that interfaces with the network core 120 and the exchange platform 122.

As illustrated in FIG. 3, the subscriber device 110 is utilized to originate a service, such as a call or message, using common standardized methods, e.g., as defined in IS-136 (a TDMA standard), IS-95 (a CDMA standard), LTE standard, etc. The subscriber device 110 would first establish a connection with a base station 312, which would in turn connect to an originating mobile switching center (O-MSC) 314. Upon receiving the origination request for a service from the base station 312, the O-MSC 314 would attempt to authenticate the subscriber device 110 by querying a visitor location register 316 and a home location register 318 to determine if the subscriber device 110 is registered with the network core 120 and authorized for use on that network, collectively referred to as "validation."

Upon successful validation, the O-MSC 314 would trigger the service manager 320, based on standardized methods, e.g., as defined in IS-41, IS-771, IS-826, etc. The service manager 320 would first authenticate the subscriber 114 based on his or her mobile directory number (MDN) and/or mobile subscriber identification (MSID), or some other type of identifier, as a valid subscriber. If the subscriber 114 is not valid, the subscriber 114 will be notified through the subscriber device 110 and the session will be terminated. If the subscriber 114 is valid, the service manager 320 will then enforce the provisioned voice or data policies or rules associated with the subscription of the subscriber 114 and sponsorships that the subscriber 114 may have selected. The policies and rules associated with the subscription may define functional restrictions such as contact restrictions, time-of-day restrictions or allowed number list functions/ blocked number list restrictions. If the subscriber 114 fails any of these provisioned policies or rules, the subscriber 114 will be notified and the session will be terminated.

If the session is allowed to progress, the service manager 320 will then rate and charge the service transactions requested during that session based on the subscription (e.g., pre-paid and post-paid charging models), the sponsorships, and the rules that the service provider 124 may have imposed on applying the sponsorships. Once the service transaction has been rated and charged, the service transaction is permitted to continue. If the service transaction is a call, a download, a text message, or any other service that requires the subscriber device 110 to be connected to another device (e.g., the third party device 140), a connection would be established to the other device over the carrier network 322, including a radio area network, and any applicable public network 324 (e.g., the network 170). This may include when, for example, the other device is a mobile station such as a cell phone, routing the connection to a terminating mobile switching center connected to the mobile station.

Turning to FIG. 4, this figure illustrates an operating environment 400 configured such that the network core 120 and the exchange platform 122 service a data session originated using the subscriber device 110. As illustrated, the network core 120 may include the base station 312 of FIG. 3, an originating packet data serving node (O-PDSN) 425, an authentication, authorization, and accounting (AAA) server 427, a home agent 426, and a carrier network 322. Also, as in FIG. 3, the network core 120 may integrate or interface with a service manager 320 that, in turn, may integrate or interface with the exchange platform 122. Additionally, the operating environment may include an enforcement module 428 and a decision module 429, each of which or both may be integrated with the network core 120, the exchange platform 122, and/or the service manager 320, or which may be a standalone computing system that interfaces with the network core 120, the exchange platform 122, and/or the service manager 320.

As in FIG. 3, the subscriber device 110 originates a session (data in this case, but could also be voice as shown in FIG. 3) by establishing a connection with the base station 312, which in turn connects to the O-PDSN 425. The O-PDSN 425 acts as a gateway by providing access to the Internet, intranets, and applications servers for the mobile subscriber device 110 and acts as a client for the home agent 426 and the AAA server 427. Upon receipt of an origination request for a service from the base station 312, the O-PDSN 425 will attempt to validate the request.

Validation involves first attempting to authenticate the subscriber device 110 by querying the AAA server 427 and the home agent 426 to determine if the subscriber device 110 is authorized to perform the requested action within the carrier network 322. If the subscriber device 110 has been validated, the O-PDSN 425 will obtain an internet protocol (IP) address for the data session and route the subscriber device 110 to the enforcement module 428.

The enforcement module 428 may be a logical element that can be physically housed in another packet data serving node or a gateway device, depending on the service request, such as a wireless application protocol (WAP) gateway, instant messaging gateway, email gateway, multimedia messaging service gateway, etc. The enforcement module 428 is responsible for enforcing a decision by the service manager 320 and/or the decision module 429 to accept or reject the service request. The decision may be based on policies and rules managed and/or stored at the enforcement module 428, the service manager 320, the decision module 429, and/or the exchange platform 122, depending on the configuration of the operating environment 400. The enforcement module 428 may operate in conjunction with the policy module 429, and depending on the configuration of the operating environment 400 possibly the service manager 320, to authenticate the subscriber 114 as a valid subscriber, based on his or her MDN and MSID, or some other type of identifier and to enforce the decision by either accepting or rejecting the service request. The decision module 429 may also be a logical element that can be physically housed in the service manager 320 or in another server accessible to either the service manager 320 or the enforcement module 428. The decision module 429 may be configured to maintain or store a list of policies that have been established to control the features and functions of the subscriber device 110 and to decide, based on those policies, to either accept or reject the service request.

The policies may be established part of the subscription of the subscriber 114 to the services of the service provider 124 and may be also associated with the rules of the sponsorships to control the features and functions of the subscriber device 110. These policies may be established by way of input received from the subscriber 114, the service provider 124, and/or the sponsor 134 at the corresponding interfaces provided by the exchange platform 122. They may include, for example, filters that specify the content that can be exchanged (e.g., downloaded, uploaded, streamed, etc.) with the subscriber device 110, the amount of data (e.g., in gigabytes increments) that can be exchanged, or the like.

For example, the service request might be initiated by the subscriber device 110, such as when the subscriber device 110 sends a request to download some type of content, such as a game, a ringtone, a website, a picture message, a text message, etc. from the third party device 140. In other cases, the request might be initiated by another device (e.g., the third party device 140) seeking to communicate with the subscriber device 110. For example, the subscriber 114 might have a text message sent to her/him by a friend, but if a policy is in place that prevents the user from receiving text messages at the time the message is sent, then the request to communicate with the subscriber 114 will be denied. Likewise, the subscriber 114's request may not have anything to do with making a call or downloading content, but rather just to use some feature or function of the subscriber device 110, such as a game that is already locally stored on the device. Even in this instance, the subscriber device 110 would need to communicate with the enforcement module 428 to determine if a policy is in place that would prevent use of the feature or function for some reason, such as the wrong time of the day, the wrong day of the week, the game has been played in excess of some time limit set on the game, etc.

In situations where the subscriber 114 is not valid, the enforcement module 428 will notify the subscriber 114 through the subscriber device 110 and take one of a number of different possible actions, such as terminating the session or transaction associated with the service request, redirecting or rewriting the session or transaction, degrading the session or transaction to a lower quality or class of service, etc. If the subscriber is valid, the enforcement module 428 will enforce the provisioned policies for the subscriber 114.

As noted above, these policies can cover many different rules that apply to the features or functions of the subscriber device 110 based on requests sent to or received from the subscriber device 110. These policies include those items noted above, but may also include many other things related to the subscription of the subscriber, such as charge balances, service state/status, provisioned services/features, user selected service controls, and other functions or functional restrictions.

If any of the provisioned policies fail (e.g., a restriction is met), the subscriber 114 is notified and the enforcement module 428 will take one of number of different possible actions, such as terminating the session or transaction, redirecting or rewriting the session or transactions, degrading the session or transaction to a lower quality or class of service, etc. When the requester is not the subscriber 114, it may be preferable to notify the requester or notify both the requester and the subscriber 114. For example, if someone attempted to call the subscriber 114, or send an email, Instant Message, or text message to the subscriber 114, and there was a policy in place that prevented the call or communication, then it might be necessary to tell that someone so they know why they cannot contact the subscriber 114 at that time. It may also be necessary to notify the subscriber 114 or an administrator so they know what happened as well. If all of the policies pass, then the session or transaction associated with the service request is permitted to continue.

Figure 5:
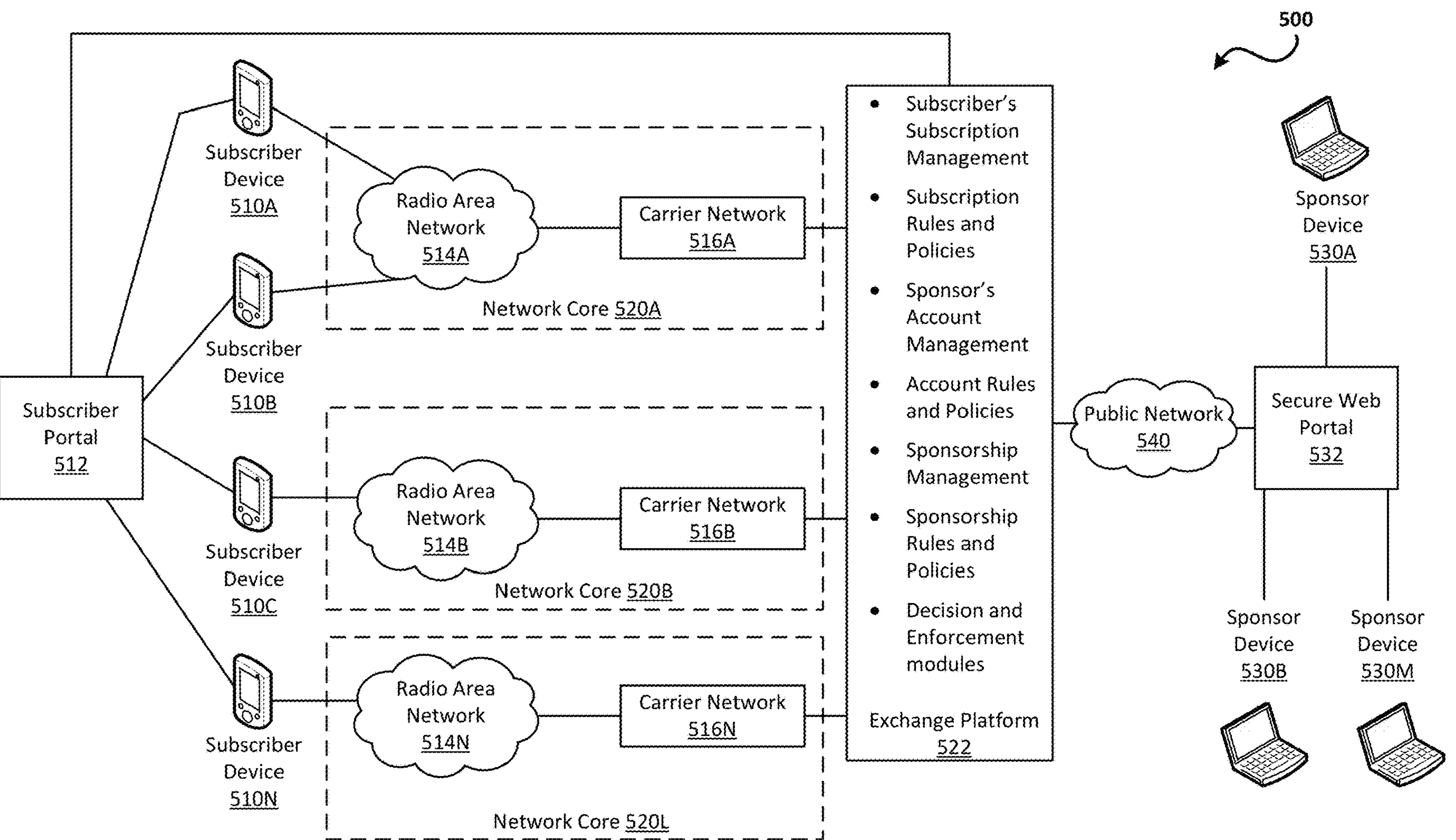
FIG. 5 illustrates an example block diagram for providing sponsored content and connectivity, according to embodiments.

Turning to FIG. 5, this figure illustrates an example operating environment 500 for setting up, signing up to, and applying sponsorships. More particularly, the operating environment may implement some or all elements of the components of FIGS. 1-4. As illustrated, the operating environment 500 includes a plurality of network cores 520A, 520B, . . . , 520L and an exchange platform 522, which may have similar architectures as the network core 120 and the exchange platform 122, respectively. For example, each of the network cores may include one or more radio area networks (shown as radio area network 514A, 514B, and 514C in FIG. 5) and one or more carrier networks (shown as carrier network 516A, 516B, and 516N in FIG. 5). The radio area networks and the carrier networks may implement some or all elements of the operating environments 300 and 400 of FIGS. 3 and 4, respectively. Additionally, the plurality of network cores may be associated with same or different service providers and may be referred herein singularly as "network core 520" or in the plural as "network cores 520." Although FIG. 5 illustrates a single exchange platform 522, a plurality of exchange platforms may be also associated with the plurality of network cores 520. As such, there may be a one-to-one, a one-to-many, a many-to-one, or a many-to-many association between each network core and each exchange platform.

In an embodiment, the network core 520 and the exchange platform 522 may be integrated, and in another embodiment, the exchange platform 520 may be hosted outside of the network core 520 and may interface therewith over a network. Independently of the embodiment, these components may be configured to facilitate a self-service set up of a sponsorship (e.g., a sponsor need not receive input from a subscriber to set up a sponsorship), a self-service sign-up to the sponsorship (e.g., the subscriber need not receive input from the sponsor to sign up for the sponsorship), and an automatic application of the sponsorship (e.g., the service provider seamlessly can enforce the rules and conditions of the sponsorship in a manner that is transparent to the sponsor and the subscriber).

As illustrated in FIG. 5, the features of the network core 520 and the exchange platform 522 may be available to a plurality of sponsors and subscribers associated with a plurality of sponsor devices 530A, 530B, . . . , 530M and subscriber devices 510A, 510B, . . . , 510N, respectively. The plurality of sponsor devices may be referred herein singularly as "sponsor device 530" or in the plural as "sponsor devices 530." Likewise, the plurality of subscriber devices may be referred herein singularly as "subscriber device 510" or in the plural as "subscriber devices 530." Each of the subscriber devices 510 and of the sponsor devices 530 may be associated with one or more network cores 520 and exchange platforms. For example, as shown in FIG. 5, subscriber devices 510A and 510B may be associated with the network core 520A of a first service provider while the subscriber device 510C may be associated with the network core 520B of a second service provider.

To set up sponsorships, the exchange platform 522 may provide a secure web portal 532 to the sponsor devices 530. Again, although a single secure web portal 532 is shown in FIG. 5, there may be a plurality of secure web portals that allow one or more sponsors to set up the sponsorships. The secure web portal 532 may interface with the exchange platform over a public network 540 (e.g., the Internet) as shown in FIG. 5, or may be integrated with the exchange platform 522. The secure web portal 532 may provide interfaces to the sponsor devices 530 for receiving information therefrom to define the various aspects of the sponsorships.

For example, each of the sponsors may be associated with an account at the exchange platform 522. The accounts may store profiles and information related to the sponsors and may allow the sponsors and the service providers to manage the sponsorships. In turn, the secure web portal 532 may authenticate and authorize a sponsor to access the corresponding account by way of identifiers and credentials of the sponsor (e.g., a username and a password). Once authenticated and authorized, the secure web portal may allow the sponsor to describe the features of the sponsorship by way of the interface. For example, the interface may allow the sponsor to search for subscribers, groups of subscribers, and/or other sponsors and to select to whom the sponsorship may be made available. The interface may also allow the sponsor to define the rules of the sponsorship, such as whether the sponsorship sponsors content and/or connectivity, the information, if any, required from the subscribers to sign up for the sponsorship, and conditions, if any, for applying the sponsorship (e.g., time/location restrictions, content restrictions, partially or fully covering charges incurred by the subscribers, etc.). Further detail of the interface is described in FIG. 7. These features of the sponsorship may be stored at the exchange platform 522 and may be associated with the account of the sponsor.

The secure web portal 532 may also allow the sponsors to access their accounts at any time such that they can dynamically update and edit their sponsorships. Additionally, the secure web portal 532 may allow the sponsors to fund or pay for the charges associated with the sponsorships by, for example, paying the service provider. These charges may be posted to the accounts of the sponsors and may be paid by credit card, an automated clearing house (ACH) process, wire transfer, or other forms of payment. Similarly, the charges may be post-paid to the service provider such that they may be connected to a billing system whereby the service provider periodically bills a sponsor for the sponsorships it has created and funded. For example, an account of a sponsor may include credits or units of value (e.g., virtual money, virtual funds, etc.) that may be applied to the charges. These units of values may be organized in wallets along with rules that define how charges can be applied to the wallets. Further detail about the wallets and the rules is described herein below with regard to wallets of the subscribers. The wallets and rules of the accounts have similar functionalities and, in the interest of clarity of explanation, the description of these functionalities is not repeated here.

The charges associated with a sponsorship may include the charges that are incurred by the subscribers for using the services of the service providers and that are sponsored by the sponsorship. Additionally, the charges may include fees that the service providers may collect from the sponsor for providing the sponsorship. These two charges may be presented to the sponsor as an aggregated total sum or as separate fees and may be billed together or separately within a same or a different billing cycle.

Once a sponsor sets up a sponsorship and subscribers sign up for it, the exchange platform 522 may populate or update the sponsor's account with information related to the status of the sponsorship. This information includes, in addition to the charges, summaries about the market penetration or success rate of the sponsorship—such as the total number of subscribers that signed-up for it—the percentage of subscribers that this sponsorship was offered to but have not signed up for it yet, the usage frequency of the sponsorship by the subscribers, and any other statistical information that may be of interest to the sponsor. The exchange platform 522 may also notify subscribers of sponsorships that are created. For example, as soon as a sponsorship is created, periodically, at intervals of time, and/or upon request from a subscriber, the exchange platform 522 may provide information about the sponsorship. This information may include a description about the sponsorship, its types, its benefits, the conditions for it to apply, the steps needed to sign-up for it, its popularity (e.g., its market penetration or how may subscribers have signed for it), its rating (e.g., what other subscribers are saying about the sponsorship), and information about other subscribers (e.g., subscribers that may be known to or friends of the subscriber) that have signed up for it, and other summaries or information that may entice the subscriber to sign up for the sponsorship. Similarly, the exchange platform 522 may provide similar information about existing, expiring, or expired sponsorships to the subscriber. Likewise, data associated with sponsorships and subscribers to sponsorships could be generated and provided to the sponsor to gauge the effectiveness of certain sponsorships in attracting certain types of subscribers, promoting certain types of behavior among subscribers, etc.

As such, by setting up the sponsorship, the sponsor may gain mind share (e.g., development of consumer awareness or popularity), may govern the content and/or connectivity sponsored by amount, type, time, location, or related rules, and may be able to trade content and/or connectivity for subscriber information (e.g., location information, demographic information, etc.). Also, by accessing the exchange platform 522 by way of the secure web portal 532, the sponsors can define the rules and policies of their sponsorships, identify the service providers that may offer the sponsorships to its subscribers, identify the subscribers of each service providers that the sponsorships may be made available to, and pay for the costs of the sponsored functions.

Similarly to the sponsors, the subscribers may be able to access and sign up for sponsorships by way of interfaces provided by a subscriber portal 512. Although FIG. 5 illustrates a single subscriber portal, a plurality of subscriber portals 512 may be used. Additionally, the subscriber portal 512 may be integrated with the exchange platform 522 or may interface therewith over a network, including for example the network core 520. In an example, the subscriber portal 512 may be a web portal that authenticates and authorizes a subscriber to access information stored at the exchange platform 522 based on, for example, the subscriber's MDN, MSID, username, password, or other identifiers and credentials. In another example, a standalone application program executing on the subscriber device 510 may connect to an application programming interface (API) exposed by the subscriber portal 512 for accessing the information.

As explained herein above, each subscriber may be associated with a subscription to services of the service provider. The subscription may be fully or partially managed at the exchange platform 522. For example, the exchange platform 522 may record information related to the various aspects of the subscription and may provide an interface to the subscriber to access the information and edit or update portions of it. The subscriber may access his or her subscription by way of the interfaces provided by the subscriber portal 512, may dynamically update the subscription (e.g., sign up for new services), and may associate a sponsorship with the subscription (e.g., by opting-in, selecting, signing upfront, or accepting automatic push of the sponsorship). Further detail about the interfaces is described in FIGS. 6A-6C.

The subscription may include a plurality of features that specify the functionalities that the subscriber device 510 may be able to execute in association with the core network 520 (e.g., when connected to it) or independently of the core network 520 (e.g., when a function of the subscriber device 510 is initiated and its execution need not have a connection to the core network 520, such as playing a game locally on the subscriber device 510). For example, the subscription can include the list of the services that the subscriber has subscribed to, a plan that the subscriber has signed up for (e.g., the amount of airtime minutes and data that the subscriber may use within a billing cycle), limits on the plan (e.g., the plan may be shared with another subscriber device 510 and may include a definition of the amount of airtime minutes and data that each of the devices can use), or the like. In addition, it may also include information related to the subscriber (e.g., his or her profile, such as age, demographic, etc.) and history of the services provided to the subscriber (e.g., previously purchased services, accepted sponsorships, billing history, etc.).

Further, charges associated with the services of the service provider may be applied to the subscription. The subscriber may pay for these charges by different forms of payments, such as by using a credit card. Additionally, the subscription may include an electronic account that holds units of value that the subscriber can fund and from which the charges can be paid. This electronic account may be also referred to herein as "a wallet," whereas the units of value can be any credits (including virtual credits) that hold a value usable for paying charges incurred, such as money, airtime minutes, a size of data, etc. The subscriber may associate a plurality of wallets with a single subscription. Additionally, the subscriber may associate a plurality of wallets with the functionalities of a single subscriber device 510 and/or a single wallet with a plurality of subscriber devices 510.

Rules specifying uses of the wallets may also be defined and associated with the subscription. These rules can identify the wallet(s) in the subscription will pay for a function. For example, the subscriber can specify that a first wallet is to be charged for voice services and a second wallet to be charged for data services. Further, the subscriber can also specify that when the units of value in the first wallet are exhausted within a billing cycle, the voice services may be disabled, while the data services may still be enabled as long as the funds in the second wallet are sufficient to pay for the data services. Alternatively, the subscriber can specify that when the units of value in the first wallet are exhausted, a portion of the remaining units of value from the second wallet can be transferred to the first wallet or used to pay for the voice services without the transfer to the first wallet. Likewise, the service provider may specify a rule by which charges are satisfied from a third wallet in the subscription when the units of value in the first and second wallets are exhausted. These rules are merely illustrative and one skilled in the art will appreciate that the subscriber and the service provider may define other rules that control the use of the wallets (e.g., how charges may be collected from the units of value in the wallets).

These rules may also be used to allow or block a function of the subscriber device 510 by, for example, enabling the function when the wallet(s) specified by the rules have sufficient funds to pay for it or otherwise disabling it. In addition to this type of functionality control, policies may be defined to also effectuate similar controls. These policies may be managed by a decision module and enforced by an enforcement module, each of which can be integrated with the exchange platform 522 similarly to the description of the the decision module 429 and enforcement module 428 of FIG. 4.

These policies may define a list of restrictions that limit certain or all of the functions of the subscriber device 510. For example, the subscriber may define a list of blocked contacts (e.g., other subscribers or users associated with computing devices) that the subscriber device 510 may not interact with. Similarly, time-based, location-based, content-based restrictions, or the like, may be defined. In a further example, the service provider may also set up filters that control, for example, the content that can be downloaded, uploaded, or streamed to the subscriber device 510. These filters can include standard content ratings (e.g., PG-13, R, etc.) and may be applied by the service provider based on the age of the subscriber.

These policies may also interact or be associated with the rules such that the enforcement of the policies may also account for the rules. For example, the policies may define a list of functions that should be allowed regardless of the rules in such a way that the policies override the rules. As such, the subscriber can define a list of allowed contacts (e.g., emergency contacts) that can always be called regardless of the limits that may be imposed on the calling function by way of the rules associated with the wallets.

As explained herein above, the various features of the subscription (e.g., the account, list of services, plan (voice/data), limits on the plan, profile, wallet, units of values, rules, policies, filters, etc.) may be stored and managed at the exchange platform 522. Further, the subscription may be associated with the sponsorships to which the subscriber signs up. For example, the subscription may be updated to include information about a selection of a sponsorship to which the subscriber has signed up. Additionally, the exchange platform 522 may facilitate the execution of the functionalities of the subscription in conjunction with the functionalities of the sponsorship. For example, the exchange platform 522 may enforce the rules and policies defined in the subscription in light of the rules and policies of the sponsorship. As such, when the subscriber executes a sponsored function on the subscriber device 510, instead of charging the corresponding cost to a wallet of the subscription as defined in the rules of the subscription, the cost may be charged to the account of the sponsor based on the rules of the sponsorship. Further, which wallet in the account of the sponsor may be charged may depend on the rules of the account.

To illustrate, as an example, the subscriber may sign up for a connectivity sponsorship that pays for all voice and data functions over the service provider's network. Thus, when the subscriber places, for example, a call, the associated cost is charged to the sponsor's account rather than the subscription. Continuing with this example, the service provider may also define a rule that limits the applicability of this sponsorship to situations where a limit on voice functions has been reached (e.g., the airtime minutes in the subscription have been used within a billing cycle). Thus, if the subscriber places a call when the subscription has enough airtime minutes to cover the corresponding cost, this cost is charged against the subscription. However, when the subscription lacks the sufficient airtime minutes, the exchange platform 522 applies the sponsorship and charges the cost to the sponsor. In this way, the service provider may be able to extend functionalities (e.g., voice calling in this example) to the subscriber device 510 at no additional cost to the subscriber. In other words, depending on the subscription rules and the sponsorship rules, when the subscriber signs up for a sponsorship, the subscriber may be able to get free connectivity and free content, may be able to provide subscriber information to the sponsors (e.g., location-based information), and may become aware of sponsor-related products and services, and the like.

Additionally, the exchange platform 522 may be configured to provide information about the subscription, sponsorships, or combination thereof to the subscriber. This may include alerting the subscriber by way of notifications when a certain condition, associated with his or her subscription, is met. For example, when the subscription includes a cap on the amount of airtime minutes that the subscriber may use within a billing cycle and when the subscriber approaches that amount within a certain range or threshold, the exchange platform may send a message to a contact point of the subscriber (e.g., to his or her subscriber device, email address, etc.). Similarly, the information may include alerts about new, existing, expiring, or expired sponsorships and/or alerts about other subscribers known to the subscriber (e.g., his or her friends, family members, circle of trust, etc.) signing-up to a particular sponsorship. Further, the exchange platform 522 may allow the subscriber to share information about sponsorships that he or she signed up for with other subscribers. For example, when the subscriber signs up for a particular sponsorship, the exchange platform 522 may automatically generate a notification describing the sign up and the particular sponsorship and provide such a notification to the other subscribers. This can include, for example, the exchange platform 522 posting the notification on a personal page of the subscriber hosted on a social media network. In another example, the information that the exchange platform exchange with the other subscribers can be comments or ratings that the subscriber provided about the particular sponsorship.

As described herein above, the exchange platform 522 may record information related to the subscriptions of the subscribers, the accounts of the sponsors, the sponsorships of the sponsors, and selections of sponsorships under the subscriptions. As such, the exchange platform 522 can be configured as a control platform that manages and tracks links between the various features of the subscriptions, characteristics of the subscribers, and/or the various features of the sponsorships.

The service provider may have access (e.g., administrative access) to the exchange platform 522 for managing the various features thereof including management of the subscriptions, the accounts of the sponsors, the sponsorships, and the enforcement of the various rules and policies. For example, the service provider may manage a subscriber's subscription by facilitating the services that are listed in the subscription, providing billing services based on the wallets and the associated rules, enforcing policies that may restrict certain functions or filter certain content, or the like. Additionally, the service provider may define rules that may override or take priority over the rules of the subscription. Examples of these rules include providing special offers, such as free trials, free calls, or facilitating emergency calls, regardless of the available units of value in the subscription.

The service provider may also manage the accounts of the sponsors by allowing the sponsors to define their sponsorships and by providing them with billing services based on service fees and charges associated with the sponsored activities of the subscribers. Further, the service provider may also enforce rules associated with the accounts (e.g., when a sponsor has multiple wallets available to pay for the charges incurred, the sponsor may define rules that specify what charges can be applied to what wallets) and may also define additional rules and policies. For example, the service provider may limit the number of sponsorships that a sponsor may provide and may prohibit certain types of sponsorships (e.g., sponsored content to adult websites or a sponsorship that collects certain subscriber-related information, such as one that requires the subscriber to provide his or age, etc.).

Furthermore, the exchange platform 522 may allow the service provider to manage the sponsorships. When a subscriber opts in to sponsorships, the service provider may provide subscriber-related information to the sponsors allowing them to offer the sponsorships to the subscriber. Similarly, when the subscriber signs up for a sponsorship, the service provider may ensure that the rules and policies of the sponsorship are applied to the sponsored functions such that, for example, the cost associated with the sponsored functions are charged to the sponsor's account rather than the subscription. Additionally, the service provider may define rules and policies that override or take priority over the rules and policies of a sponsorship.

For example, the service provider may specify that a sponsorship is applicable to the subscription only after the units of value of the subscription have been exhausted. In another example, the service provider may specify whether a subscriber can sign up for multiple sponsorships and/or whether a sponsor can offer multiple sponsorships to subscribers. This may also include whether an exclusive sponsorship may be offered (e.g., an exclusive sponsorship may specify that a function is sponsored by the sponsor provided that the subscriber accepts no other sponsorships for that function, or other functions, from other sponsors). In yet another example, the service provider can specify a rule that, upon detection of a condition in the subscription (e.g., units of value passing a threshold or being exhausted), generates and sends a notification (e.g., an electronic communication such as an automated call, text message, email, etc.) to the subscriber informing him or her of available sponsorships that can resolve the condition. As such, if the subscriber is not signed up for a connectivity sponsorship and reaches a limit on the available airtime minutes, the service provider can automatically notify him or her of a sponsorship that can cover voice calls that would otherwise exceed the limit.

The exchange platform 522 may also allow the service provider to provide information about the subscriptions, the subscribers, the sponsorships, the sponsors, the accounts of the sponsors, and/or the sign ups to the sponsorships to the various subscribers and sponsors. This can be in the form of announcements, notifications, alerts, or messaging functions that can tell subscribers about their subscriptions and when a new sponsorship has been created, what sponsorships exist at a given moment in time and/or at a given place, sponsorships that are about to expire within a certain timeframe (e.g., a week), or sponsorships that have expired. Likewise, the service provider can use the exchange platform to generate messages to the sponsors informing them of the status of their sponsorships, providing account-related information (e.g., balance due, when the balance passes a threshold, etc.), and describing sponsorships offered by other sponsors (e.g., the service provider may describe to CompanyABC a sponsorship offered by CompanyXYZ).

Once the various aspects of the subscriptions, sponsorships, and applicable rules and policies are defined, the exchange platform 522 may seamlessly enforce these aspects against functions executed on the subscriber device 510. This enforcement may be automatic and transparent to the sponsor and the subscriber. In other words, when the subscriber executes a sponsored function on the subscriber device 510 (e.g., placing a call along with a selected connectivity sponsorship), the associated charges are automatically deducted from the subscription and/or account of the sponsor based on the various rules and policies and without additional input from the subscriber or the sponsor.

As described herein above, a service provider may register its subscribers (e.g., the subscribers that have opted in to allow sponsorships) on the exchange platform 522 and may provide access to information related to the registered subscribers to the sponsors by way of the secure web portal 532. This allows the sponsors to access this information, to specify what functions they are willing to sponsor, for what subscribers, and to establish the rules of the sponsorships as further described in FIG. 7. Likewise, the service provider may or may not allow the subscribers to access a subscriber section of the exchange platform 522. For example, the service provider may only provide an option to opt in to sponsorships to a subscriber. In such a case, the subscriber may not have access to sponsorship-related information managed at the exchange platform 522 beyond a selection to opt in or out. In this case, when the subscriber opts in, the service provider may apply all or certain available sponsorships based on its rules and policies. Alternatively, the service provider may allow the subscriber to search and select one or more specific sponsorships. In such a case, the subscriber can use the subscriber portal 512 to specify the terms of the sponsorship(s) he or she is willing to accept. For example, the subscriber may agree to share location data with a sponsor in return for a sponsored connectivity. In another example, the subscriber can specify that he or she is willing to accept sponsorship parameters accepted by another subscriber (e.g., parameters already specified by/for a friend who refers the subscriber to the exchange platform 522 via a text message, email or some other social networking action). Various aspects of the actions available to a subscriber are illustrated in FIGS. 6A-6C.

Turning to FIG. 6A, this figure illustrates a basic layout of an interface that a subscriber can use to sign up for a sponsorship. Various techniques may be used to do so, including opting-in to all sponsorships, selecting a specific number of sponsorships, signing-up for a set of sponsorships upfront, accepting a set of sponsorships to be automatically pushed with a service, or the like. Although FIG. 6A illustrates these four techniques on a single graphical user interface, each technique and/or other techniques may be implemented on a separate interface or may be implemented in any combination on the interface.

The opt-in feature allows the subscriber to accept the sponsorships that the service provider and/or the sponsors may offer him or her independently of the functions that are sponsored. When the opt-in feature is selected (e.g., by clicking on the corresponding radial box), the service provider may share subscriber-related information with sponsors and may also associate the subscriber's subscription with the sponsorships that the sponsors have already made available to its subscribers. Additionally, if a sponsor only offers a sponsorship to specific subscribers, this sponsor may use the subscriber-related information to decide whether to make such a sponsorship available to the subscriber.

The "select sponsorships based on my criteria" feature shown in FIG. 6A may allow the subscriber to select specific sponsorships as further illustrated in FIGS. 6B and 6C. For example, this feature allows the subscriber to search and select sponsorships based on criteria that he or she defines (e.g., the type of sponsorship, whether the sponsor can access location-based information of the subscriber device, etc.). When selected (e.g., by clicking on the corresponding radial box), this feature may also allow the service provider to share the subscriber-related information with sponsors that meet the criteria of the subscriber. The opt-in feature and the select sponsorship feature may work in conjunction. For example, both can be selected and when so, the selection of the "opt-in to sponsorships" feature allows the service provider to share the subscriber-related information with the sponsors and the selection of the "select sponsorships based on my criteria" allows the subscriber to select specific sponsorships that the sponsors may offer.

The "sign up upfront to a set of sponsorships" feature shown in FIG. 6A may allow the subscriber to sign up for a particular set of sponsorships when he or she initially subscribes to a service of the service provider to which the particular set of sponsorships may apply. This may also include situations where the subscriber receives or purchases a subscriber device to which the particular set of sponsorships may apply. As illustrated in FIG. 6A, the corresponding radial box may be automatically selected (shown as a filled-out radial box) when the subscriber subscribes to the service or obtains the subscriber device. The exchange platform may prohibit the subscriber from deselecting this radial box for, except under certain conditions, to indicate his or her intent to remove the particular set of sponsorships. These conditions can be, for example, time-based. In other words, after a certain timeframe (e.g., a year) from subscribing to the service, the subscriber may not deselect the particular set of sponsorship. But, he or she may do so thereafter. Another example of conditions can be cost-based. In this example, when the subscriber has spent a certain amount, units of value, or funds on the service or other services of the service provider, the subscriber may be able to deselect the particular set of sponsorships. One skilled in the art will appreciate that other conditions may also be used. The service provider and/or the sponsor(s) associated with the particular set of sponsorships may define these conditions within their corresponding rules and policies.

The "accept a set of sponsorships to be automatically pushed" feature shown in FIG. 6A may allow the subscriber to accept certain sponsorship(s) such that they are automatically applied to the service of the service provider that the subscriber uses. For example, the subscriber may be subscribed to a data plan offered by the service provider. By selecting the radial box associated with this feature, the subscriber may automatically benefit from sponsorships that may be offered at any time. As such, if a sponsor offers a special data sponsorship during a holiday season or a promotional period of time, this special sponsorship may be automatically applied to the subscriber's usage of the data plan during the holiday season or the promotional period of time. In another example, the applicability of the sponsorships may be conditioned. As such, a sponsor may offer a sponsorship that is only available within a certain location. If the subscriber is within a certain geographical range of the location, the sponsorship may be pushed to the subscriber device (e.g., may become automatically applicable to the service of the service provider used by the subscriber while being located within the certain geographic range). Other conditions may also be defined and may include time-based conditions, cost-based conditions, or the like. The service provider and/or the sponsor(s) associated with the sponsorships may define these conditions within their corresponding rules and policies.

FIG. 6B illustrates another interface that the subscriber can use to select specific sponsorships. As illustrated, this interface may include a search field in which the subscriber may type a string of characters that represent search criteria and that are used by a search engine of the exchange platform 522 to return results (e.g., list of sponsors) that meet the search criteria. The interface may also include multiple tabbed windows that the subscriber can select. FIG. 6B shows only the window corresponding to the "Alphabetical Order" tab. However, similar windows (e.g., windows with similar layouts and functionalities) are also available under the tabs of "Category," "Sponsorship Rule," and "Friends."

For example, the window of the "Category" tab may list the various sponsors based on the types of sponsorships that they provide. As such, sponsors that sponsor connectivity may be listed together but in a different group than the ones that sponsor content. Likewise, the window of the "Sponsorship Rule" tab may list the various sponsorships based on the associated rules. For example, when two sponsorships have the same rule (e.g., the subscriber can get free connectivity if the subscriber provides location-based information), the two sponsorships may be listed in the same group. Similarly, the window of the "Friends" tab may list the sponsorships that the friends of the subscriber have selected. For example, when the subscriber opts in for sponsorships, he or she may also consent to providing the exchange platform 522 with access to his or her address book. As such, the exchange platform 522 can retrieve the list of contacts of the subscriber and can check these contacts against other subscribers that have opted in and/or selected sponsorships. The result of such a check can be displayed in the "Friends" tab window in a list format that identifies the sponsorships and the contacts that have selected them. Likewise, in this window of the "Friends tab" or in another window, a selection box may be available to the subscriber for sharing the sponsorship(s) that he or she selects with a list of contacts. When checked, this selection box allows the exchange platform 522 to generate a message describing the selection (e.g., identifying the subscriber, the selected sponsorship(s), etc.) and send, provide, or display the message to the contacts on the list. For example, the exchange platform 522 may access a personal page of the subscriber hosted on a social networking platform by way of a corresponding API and post the message on such a page. Similarly, the exchange platform 522 may send the message by way of emails or any messaging platform to addresses of the contacts. Additional tabs may also be defined in the interface of FIG. 6B.

As shown under the window of the "Alphabetical Order" tab, a number of sponsorship-related information may be displayed. For example, each of the sponsorships may be identified by its name, the sponsor, and the rule. Other information may also be used such as any information that may help the subscriber in the selection of desired sponsorships. The sponsorships may be listed by the alphabetical order of their names, the sponsors, and/or the rules. Additionally, a corresponding "Allow" box may be displayed next to each of the sponsorships. A selection of this box indicates that the corresponding sponsorship has been selected by the subscriber. The window may also include an "Allow All" box that, when selected, indicates that all of the sponsorships have been selected by the subscriber. This box may provide a quick way for the subscriber to select more than one sponsorship.

Turning to FIG. 6C, this figure illustrates an interface that the subscriber can use to specify what information may be provided to the sponsors. For example, the subscriber may agree to provide location-based information and address book information by selecting the corresponding fields on the interface. Additionally, this interface may allow the subscriber to select one or more sponsors that meet certain criteria. For example, when the subscriber desires to receive location-based services, he or she can select the "Allow sponsors that provide location-based services" box, which in turn automatically signs up the subscriber to the sponsorships that are location-based (e.g., the sponsorships that include rules specifying that a function may be sponsored based on the location of the subscriber device). Similarly, the user can select sponsorships that provide emergency-based services (e.g., the sponsorships that sponsor functions in emergency situations) by selecting the corresponding box on the interface.

The interfaces of FIGS. 6A-6B may work in conjunction. For example, when the subscriber selects a sponsorship using the interface of FIG. 6B and when the subscriber does not allow the sponsor to access his or her location information using the interface of FIG. 6C, if the sponsorship requires the location information, the exchange platform 522 may not enforce the sponsorship (e.g., charges incurred by the subscriber with regard to the sponsored function are charged to the subscriber rather than the sponsor). Further, the various available selections under the interfaces may be set to a default state (e.g., none is checked or some are checked while others are not) or may be automatically set to a state based on a related selection (e.g., when the subscriber selects a sponsorship with a rule that requires location information under the interface of FIG. 6B, the "Access to my location" feature under the interface of FIG. 6C may be automatically checked).

Similar to the interfaces of FIGS. 6A-6C, various interfaces can be provided to the sponsors for setting up the sponsorships. FIG. 7 illustrates an example of such interfaces available to a sponsor for defining various aspects of the sponsorships. As illustrated, this interface may include a search field in which the sponsor may type a string of characters that represent search criteria and are used by the search engine of the exchange platform 522 to return results (e.g., list of subscribers) that meet the search criteria. The interface may also include multiple tabbed windows that the sponsor can select. FIG. 7 shows only the window corresponding to the "Subscribers" tab. However, similar windows (e.g., windows with similar layouts and functionalities) are also available under the tabs of "Group of Subscribers," "Service Providers," and "Location."

For example, the window of the "Group of Subscriber" tab may list groups of subscribers to whom the sponsor may render the sponsorships available. Each of the groups may represent, for example, an organization within a company. Likewise, the window of the "Service Providers" tab may list the various service providers that the sponsor may want to offer sponsorships therethrough. This window can include a list of the service providers that use the exchange platform 522 and/or a list of the service providers with who the sponsor has accounts. Additionally, for each listed service provider, a list of its corresponding subscribers may be displayed. As such, this window may allow the sponsor to decide which service providers and to which subscribers of these service providers to offer the sponsorships. The window of the "Location" tab may display information about the subscribers based on their locations and may allow the sponsor to offer sponsorships based on the locations (e.g., offer a connectivity sponsorship to subscribers in one city and content sponsorship to subscribers in another city). Various location resolutions may be used. For example, this window may list the subscribers and/or service providers within a city, a state, or a region of the country. Additional tabs may also be defined in the interface of FIG. 6B. Any of these windows may further list the sponsorships that the sponsor has made available and may allow the sponsor to define new sponsorships and/or make updates or revisions thereto.

As shown under the window of the "Subscribers" tab, a number of sponsorship-related and subscriber-related information may be displayed. For example, this window may display fields for allowing the sponsor to define the various sponsorships (shown in FIG. 7 as a table on the right-hand side). For each sponsorship, the sponsor may enter a title (shown as sponsorship 1, sponsorship 2, . . . , sponsorship M) and a description of the associated rule (shown as "pay for data," "pay for voice," . . . , "pay only for visiting website"). Because various parameters may be used for defining the sponsorships (e.g., the when, what, how, who, where, and other conditions as explained herein above), additional fields corresponding to each of the parameters may also be displayed in this window. Further, this window may list the subscribers (e.g., by alphabetical orders) who have opted in for sponsorships. Next to each listed subscriber, there may be a field (shown as a radial box in FIG. 7) that may be selected by the sponsor to indicate a desire to offer sponsorships thereto. Also, there may be a "Sponsor All" field that provides a quick way for the sponsor to offer sponsorships to all of the subscribers with a single selection. For each subscriber, the sponsor may select the sponsorship(s) that should be offered.

The interfaces of FIGS. 6A, 6B, 6C, and 7 are illustrative and one skilled in the art will appreciate that various other features and layouts for setting up and signing up to sponsorships may be implemented. For example, the subscriber interfaces may be customized based on the subscriber and/or the subscription. The subscriber interfaces may display the subscriber's name, an identifier of the subscriber device(s), and account information such as various summaries of the account that may help the subscriber decide whether to sign up for sponsorships and the types of sponsorships to sign up for (e.g., available balance within the wallets, remaining amount of voice and data, etc.). The subscriber interfaces may also display information about the sponsor and the use of information provided by the subscriber to the sponsors. For example, next to a displayed sponsor name, there may be a short description identifying the sponsor (e.g., business domain, line of products, address, URL, etc.) and a link to a page that describes how the sponsor may use the information of the subscriber.

Figure 8:
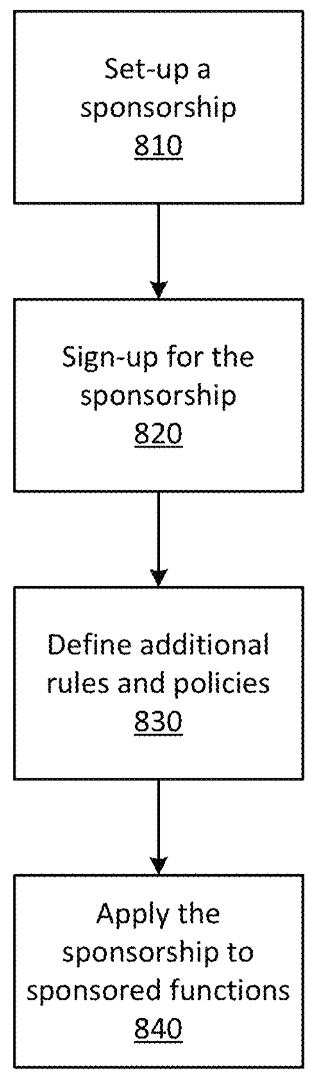
FIG. 8 illustrates an example procedure for providing sponsored content and connectivity, according to embodiments.

An example procedure for applying a sponsorship to a sponsored function of a subscriber device is described in FIG. 8. The procedures may be implemented using, for example, components of the operating environments 100 and 500 of FIGS. 1 and 5, respectively. In the interest of clarity of explanation, FIG. 8 is described with respect to a single sponsor, a single subscriber, a single service provider, and a single sponsorship. However, the procedure could also be used in connection with a plurality of sponsors, subscribers, service providers, and sponsorships.

Operation 810 illustrates the sponsor setting up a sponsorship. This operation may include the sponsor accessing an account managed at the exchange platform 522 by way of the secure web portal 532 and using the interface of FIG. 7 to define the various parameters of the sponsorship. This operation may also include other account-related activity, such as the sponsor defining rules for charging the cost of the sponsorships to wallets of the account.

Operation 820 illustrates the subscriber signing up for the sponsorship. This operation may include the subscriber accessing a subscription managed at the exchanged platform 522 by way of the subscriber portal 512 and using the interfaces of FIG. 6A-6C to find and select the sponsorship and to agree to the subscriber-related information that may be provided to the sponsor. This operation may also include other subscription-related activity, such as the subscriber defining rules for charging the cost of the functions to wallets of the subscriptions, policies controlling the functions, and the like.

Operation 830 illustrates the service provider defining additional rules and policies that may control the application or the enforcement of the sponsorship. For example, under this operation, the service provider may specify that the sponsorship is to be applicable even when the units of value in the wallets of the subscription are sufficient to cover the cost of the sponsored function.

Operation 840 illustrates the exchange platform 522 applying the sponsorship to the sponsored functions. This operation may include enforcing the rules and policies specified by the sponsor, subscriber, and service provider to the sponsored functions. For example, when the sponsorships pays for voice calls and when the subscriber places a voice call to an allowed contact, the cost of the voice call may be charged to the sponsor instead of the subscriber.

Although sponsorships were described herein within the context of personal electronic devices, subscribers, service providers, and sponsors, such sponsorships may also be utilized within other contexts. Further, each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It should also be appreciated that the network topologies illustrated in the figures have been greatly simplified and that many more networks and networking devices may be utilized to interconnect the various computing systems disclosed herein. These network topologies and devices should be apparent to those skilled in the art.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method executable on a first computing device associated with a sponsor for sponsoring a second computing device associated with a subscriber to services of a service provider, the service supporting a use of the second computing device over a network of the service provider, the method comprising:

sending, by the first computing device to an exchange platform, a request to establish an account associated with the sponsor and managed by the service provider, the account comprising an identifier of the sponsor;

sending, by the first computing device to the exchange platform, first information indicative of a selection of a sponsorship, the first information associating the selected sponsorship with the account and comprising a rule for applying the sponsorship to the second computing device, the rule usable to determine in real time whether the services of the service provider are allowed to be accessed by the second computing device based on the sponsorship, automatically applying the sponsorship for a specified period, without presentation of advertisements and notifications to initiate the sponsorship by the second computing device, and based on one or more conditions, including a current location of the second computing device, the services including a plurality of features that specify functionalities that the second computing device can access in association with a core network and independently of the core network; and receiving, by the first computing device from the exchange platform, second information indicative of an application of the sponsorship to the second computing device based at least in part on the rule.

2. The method of claim 1, wherein the second information comprises a charge associated with a cost for executing a function on the second computing device.

3. The method of claim 2, wherein the charge is posted to the account.

4. The method of claim 2, wherein the account comprises units of value, and wherein the charge is deducted from the units of value.

5. The method of claim 1, wherein the sponsorship sponsors any or a combination of: a voice function, a data function, content that can be used by the second computing device, a data bandwidth available to the second computing device, a service upgrade associated with the execution of the function, a cost associated with obtaining the second computing device, or a cost associated with using the second computing device.

6. The method of claim 1, wherein the rule specifies at least a condition for applying the sponsorship to the second computing device.

7. The method of claim 6, wherein the condition comprises any or a combination of: location-based condition, time-based condition, or a cost-based condition.

8. The method of claim 1, wherein the first information comprises any or a combination of: identifiers of users of computing devices that the sponsorship is made available to, identifiers of groups of the users of the computing devices, identifiers of service providers that facilitate uses of the computing devices, a time frame identifying when the sponsorship is available, a location within which the sponsorship is available, costs that are covered by the sponsorship, and information required from the users to sign-up for the sponsorship.

9. The method of claim 1, further comprising accessing the account to dynamically update the rule for applying the sponsorship.

10. The method of claim 1, further comprising receiving a notification indicative of a selection of the sponsorship by the subscriber.

11. The method of claim 1, further comprising allowing the sponsor to send an alert to subscribers to the service provider, the alert comprising a description of the sponsorship.

12. The method of claim 1, further comprising accessing the account to receive information about a balance due to the service provider and associated with the sponsorship, a market penetration of the sponsorship, and subscribers that the sponsorship is available to.

13. A system configured to define information about a sponsorship that sponsors a computing device, the system comprising:

a processor;

a memory having stored thereon instructions that, upon execution by the processor, cause the system to at least:

generate data usable to render an interface operative to allow a sponsor to define the information about the sponsorship, the information comprising a type of the sponsorship and a rule for applying the sponsorship, wherein the system dynamically adjusts the rule independent of a use of a computing device; and send the information to a second system configured to support the use of the computing device, the computing device being associated with a user, the second system being associated with a network of a service provider, the second system being configured to support the use of the computing device based at least in part on a subscription of the user to services of the service provider, the information causing the second system to automatically apply, based at least in part on the rule, the sponsorship to the use of the computing device without presentation of advertisements and notifications to initiate the sponsorship, wherein the sponsorship is applied for a specified period and based on a current location of the computing device, and the subscription includes a plurality of features that specify functionalities that the computing device can use in association with a core network and independently of the core network.

14. The system of claim 13, wherein the rule specifies that the sponsorship covers a cost associated with the use of the computing device when the type of the sponsorship covers the use of the computing device.

15. The system of claim 13, wherein the type of the sponsorship comprises any or a combination of: sponsored connectivity, sponsored content, sponsored data bandwidth, sponsored service upgrade, or a sponsored cost for obtaining the device.

16. The system of claim 13, wherein the rule specifies any or a combination of: a time frame when the sponsorship is available, a cost covered by the sponsorship, information required from the second user, or a location within which the sponsorship is available.

17. The system of claim 13, wherein the rule specifies a condition for applying the sponsorship, wherein the condition comprises any or a combination of: a demographic of the second user, a location of the computing device, a time restriction, or a threshold defined by the service provider.

18. The system of claim 13, wherein the rule comprises a rule for deducting a cost associated with applying the sponsorship from units of value associated with the sponsor.

19. The system of claim 13, wherein the interface allows the sponsor to search for users subscribed to the service and to make the sponsorship available to a set of the users.

20. The system of claim 13, wherein the instructions further comprise instructions that, upon execution by the processor, cause the system to send an alert to the second user that the sponsor has defined the sponsorship and to receive an alert that the second user has selected the sponsorship.

21. A non-transitory computer readable storage medium comprising instructions that, upon execution on a first system configured to allow a sponsor to generate a sponsorship associated a computing device, cause the first system to perform operations comprising:

associating one or more rules with the sponsorship, the one or more rules defined by the sponsor and specifying an automatic application of the sponsorship to the computing device, the sponsorship covering a cost associated with a use of the computing device based at least in part on the automatic application;

providing information indicative of the one or more rules to a second system configured to at least initiate the sponsorship for a specified period, based on a current location of the computing device, and facilitate the use of the computing device by a user without presentation of advertisements and notifications and based on the sponsorship, wherein the first system dynamically adjusts the one or more rules independently of the use of the computing device; and receiving from the second system an indication of the use of the computing device, the indication comprising charging the cost associated with the use of the computing device to an account of the sponsor based on the sponsorship, the use including a plurality of features that specify functionalities that the computing device can execute in association with a core network and independently of the core network.

22. The computer readable storage medium of claim 21, wherein the use of the computing device comprises any or a combination of: voice function, a data function, accessing content, or obtaining the computing device.

23. The computer readable storage medium of claim 21, wherein the one or more rules are specified by the user.

24. The computer readable storage medium of claim 23, wherein the user is a sponsor, the computing device is associated with a subscriber subscribing to services provided by a service provider, the second system being associated with the service provider and comprising a network operated at least in part by the service provider.

25. The computer readable storage medium of claim 21, wherein the one or more rules specify one or more conditions for applying the sponsorship to the computing device, the one or more conditions including a combination of any of: identifiers of users of computing devices that the sponsorship is made available to, identifiers of groups of the users of the computing devices, identifiers of service providers that facilitate uses of the computing devices, a time frame identifying when the sponsorship is available, costs that are covered by the sponsorship, and information required from the users to sign-up for the sponsorship.

* * * * *